United States Patent
Hosseini et al.

(10) Patent No.: US 12,489,534 B2
(45) Date of Patent: Dec. 2, 2025

(54) ADJACENT CHANNEL INTERFERENCE MITIGATION FOR ULTRA-WIDEBAND SYSTEMS

(71) Applicant: QUALCOMM Incorporated, San Diego, CA (US)

(72) Inventors: Ehsan Hosseini, San Diego, CA (US); Dongsik Kim, San Diego, CA (US); Koorosh Akhavan, San Diego, CA (US); Le Nguyen Luong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 18/332,623

(22) Filed: Jun. 9, 2023

(65) Prior Publication Data

US 2024/0413916 A1 Dec. 12, 2024

(51) Int. Cl.
*H04B 17/336* (2015.01)
*H04L 25/02* (2006.01)

(52) U.S. Cl.
CPC ....... *H04B 17/336* (2015.01); *H04L 25/0212* (2013.01)

(58) Field of Classification Search
CPC .......................... H04B 17/336; H04L 25/0212
See application file for complete search history.

(56) References Cited

U.S. PATENT DOCUMENTS

| | | | |
|---|---|---|---|
| 2006/0029236 A1 | 2/2006 | Wu et al. | |
| 2013/0272170 A1* | 10/2013 | Chatterjee | H04W 76/19 370/280 |
| 2018/0034731 A1* | 2/2018 | Yang | H04L 25/022 |
| 2020/0287728 A1* | 9/2020 | Danev | H04W 12/104 |

OTHER PUBLICATIONS

Grobwindhager B., et al., "Enabling Runtime Adaptation of Physical Layer Settings for Dependable UWB Communications", 2018 IEEE 19th International Symposium On "A World of Wireless, Mobile and Multimedia Networks" (WOWMOM), IEEE, Jun. 12, 2018, 11 Pages, XP033394317, Section I, p. 2, Section II.B, p. 2, col. 2, Section IV, p. 7, col. 2, Section IV.B, p. 8, col. 1.
International Search Report and Written Opinion—PCT/US2024/031199—ISA/EPO—Sep. 11, 2024.

* cited by examiner

*Primary Examiner* — Zhiren Qin
(74) *Attorney, Agent, or Firm* — Holland & Hart LLP

(57) ABSTRACT

This disclosure provides methods, components, devices and systems for adjacent channel interference (ACI) mitigation techniques for ultra-wideband (UWB) systems. Some aspects more specifically relate to ACI mitigation for UWB systems. In some implementations, a wireless communication device may receive control information that identifies a preamble for communications to the wireless communication device in a UWB system. The wireless communication device may receive, via a signal in the UWB system, a data packet that includes the preamble. The wireless communication device may estimate a channel impulse response (CIR) of the signal and determine an interference metric that is based on the estimated CIR. The wireless communication device may process the data packet based on the interference metric.

30 Claims, 10 Drawing Sheets

ADJACENT CHANNEL INTERFERENCE MITIGATION FOR ULTRA-WIDEBAND SYSTEMS

TECHNICAL FIELD

This disclosure relates to wireless communication and, more specifically, to adjacent channel interference (ACI) mitigation for ultra-wideband (UWB) systems.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, two or more wireless devices may exchange signaling and measure a channel impulse response (CIR) between the two or more wireless devices.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication at a wireless communication device. The method may include receiving control information that identifies a preamble for communications to the wireless communication device in an ultra-wideband (UWB) system, receiving, via a signal in the UWB system, a data packet that includes the preamble, determining an interference metric that is based on an estimated channel impulse response (CIR) of the signal, and processing the data packet based on the interference metric.

Another innovative aspect of the subject matter described in this disclosure can be implemented in an apparatus for wireless communication. The apparatus may include at least one processor, at least one memory coupled with the at least one processor, and instructions stored in the at least one memory. The instructions may be executable by the at least one processor to cause the apparatus to receive control information that identifies a preamble for communications to the wireless communication device in an UWB system, receive, via a signal in the UWB system, a data packet that includes the preamble, determine an interference metric that is based on an estimated CIR of the signal, and process the data packet based on the interference metric.

Another innovative aspect of the subject matter described in this disclosure can be implemented in an apparatus for wireless communication. The apparatus may include means for receiving control information that identifies a preamble for communications to the wireless communication device in an UWB system, means for receiving, via a signal in the UWB system, a data packet that includes the preamble, means for determining an interference metric that is based on an estimated CIR of the signal, and means for processing the data packet based on the interference metric.

Another innovative aspect of the subject matter described in this disclosure can be implemented in a non-transitory computer-readable medium storing code for wireless communication at a wireless communication. The code may include instructions executable by a processor to receive control information that identifies a preamble for communications to the wireless communication device in an UWB system, receive, via a signal in the UWB system, a data packet that includes the preamble, determine an interference metric that is based on an estimated CTR of the signal, and process the data packet based on the interference metric.

In some examples of the method, apparatuses, and non-transitory computer-readable medium described herein, determining the interference metric may include operations, features, means, or instructions for estimating the CIR of the signal across the preamble of the data packet, where the interference metric may be based on the CIR.

Some examples of the method, apparatuses, and non-transitory computer-readable medium described herein may further include operations, features, means, or instructions for determining a signal-to-interference-plus-noise ratio (SINR) across the preamble of the data packet, where processing the data packet may be based on the interference metric and the SINR.

In some examples of the method, apparatuses, and non-transitory computer-readable medium described herein, processing the data packet may include operations, features, means, or instructions for demodulating a post-preamble portion of the data packet based on a value of the interference metric not satisfying an interference threshold, a value of the SINR satisfying an SINR threshold, or both.

In some examples of the method, apparatuses, and non-transitory computer-readable medium described herein, processing the data packet may include operations, features, means, or instructions for refraining to demodulate a post-preamble portion of the data packet based on a value of the interference metric satisfying an interference threshold, a value of the SINR not satisfying an SINR threshold, or both.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
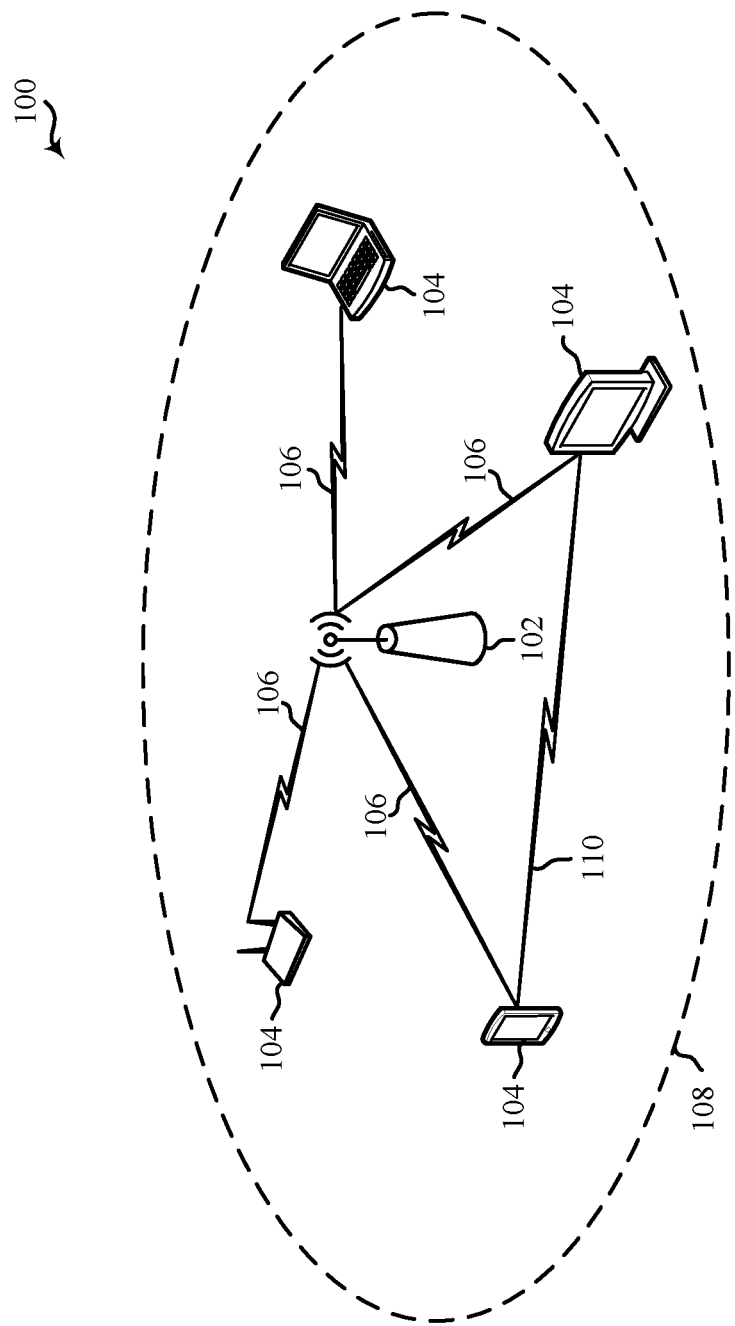
FIG. 1 shows a pictorial diagram of an example wireless communication network that supports techniques for adjacent channel interference (ACI) mitigation for ultra-wideband (UWB) systems according to some aspects of the present disclosure.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to adjacent channel interference (ACI) mitigation for ultra-wideband (UWB) systems. Some aspects more specifically relate to a framework for detecting a presence of interference based on an estimated channel impulse response (CIR) of a signal. In some implementations, a wireless communication device, such as an access point (AP) or a station (STA), may be configured with a preamble code to use for communications within a UWB system. For example, the wireless communication device may receive control information from another wireless communication device. The control information may identify a preamble code for communications to the wireless communication device in the UWB system. For instance, the wireless communication device may monitor for data packets that include the preamble code. In some implementations, the wireless communication device may receive, via a signal, a data packet that includes the preamble code. For example, the data packet may include a field whose contents include the preamble code. Accordingly, the field may be referred to as the preamble of the data packet. In response to receiving the data packet (for example, one or more portions of the data packet, such as the preamble), the wireless communication device may estimate the CIR of the signal over a portion of the data packet that includes the preamble code. The estimated CIR may represent one or more signals received at the wireless communication device. For example, the estimated CIR may represent or characterize signals (for example, direct signals, signal reflections, interfering signals) received at the wireless device over the portion of the data packet.

The wireless device may determine an interference metric for the signal based on the estimated CIR. The interference metric may be usable at the wireless device to determine whether the data packet is intended for the first wireless device. For example, the first wireless device may determine that the interference metric fails to satisfy an interference threshold. In such an example, the wireless device may detect a presence of interference and, as such, may determine that the received data packet may not be intended for the first wireless device. Accordingly, the wireless device may refrain from demodulating one or more other portions of the data packet, such as one or more portions that occur after the preamble. Alternatively, the wireless communication device may determine that the interference metric satisfies the interference threshold. In such an example, the wireless communication device may determine a lack of interference and, as such, may determine that the received data packet may be intended for the wireless communication device. Accordingly, the wireless communication device may demodulate one or more other portions of the data packet. In some implementations, the wireless communication device may calculate a signal to interference plus noise ratio (SINR) for the received data packet. For example, in response to detecting the presence if interference, the wireless communication device may calculate a value of the SINR for the data packet across the portion of the data packet or across one or more other portions of the data packet. In some implementations, the wireless communication device may determine to monitor for additional data packets that may include the preamble based on the value of the SINR.

Particular aspects of the subject matter described in this disclosure can be implemented to realize one or more of the following potential advantages. In some implementations, by determining an interference metric based on an estimated CIR of a signal carrying a data packet, the described techniques may support interference mitigation techniques for overlapping or partially overlapping data packets. In addition, by using the interference metric based on the estimated CIR to detect a presence of interference, the described techniques may support interference mitigation techniques for relatively strong signals, or signals transmitted on adjacent channels within the UWB system, or both. Some UWB systems may be susceptible to relatively high packet error rates and, by determining the interference metric based on the estimated CIR, the described techniques may support an increased rate of interference detection, which may lead to reduce packet error rates. That is, an increased rate of interference detection may reduce a likelihood of a wireless communication device failing to receive a data packet, for example, while processing another data packet that may not be intended for the wireless communication device. Further, by calculating a value of the SINR in response to detecting the presence of interference, such techniques may provide a mechanism for tracking interference, which may lead to improved signal processing. The techniques described herein may accordingly experience improved packet error rate performance, higher data rates, and reduce latency, among other benefits. Additionally, in some cases, a wireless communication device may support clear channel assessment (CCA) operations, in which the wireless device may perform preamble detection to determine whether a channel is busy or idle. The techniques described herein may provide one or more enhancements to CCA operations by enabling the wireless device to distinguish an interfering adjacent channel interferer from a desired channel and by reducing a likelihood of false preamble detection during a CCA.

FIG. 1 shows a pictorial diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and 802.11bn). The WLAN 100 may include numerous wireless communication devices such as a wireless AP 102 and multiple wireless STAs 104. While one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR) can be further improved by a small cell which is supported by an AP 102 serving as a miniature base station. Further, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

In some wireless communications environments, Extremely High Throughput (EHT) systems or other systems compliant with future generations of the IEEE 802.11 family of wireless communication protocol standards may provide additional capabilities over other previous systems (for example, High Efficiency (HE) systems or other legacy systems). EHT and newer wireless communication protocols may support flexible operating bandwidth enhancements at APs 102 and STAs 104, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some implementations in which a wireless communication device operates in a contiguous 320 MHz bandwidth mode or a 160+160 MHz bandwidth mode. Signals for transmission may be generated by two different transmit chains of the device each having a bandwidth of 160 MHz (and each coupled with a different power amplifier). In some other examples, signals for transmission may be generated by four or more different transmit chains of the device, each having a bandwidth of 80 MHz.

In some other examples, the wireless communication device may operate in a contiguous 240 MHz bandwidth mode, or a noncontiguous 160+80 MHz bandwidth mode. In some implementations, the signals for transmission may be generated by three different transmit chains of the device, each having a bandwidth of 80 MHz. In some other examples, the 240 MHz/160+80 MHz bandwidth modes also may be formed by puncturing 320/160+160 MHz bandwidth modes with one or more 80 MHz subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some implementations, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

APs 102 and STAs 104 that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas.

APs 102 and STAs 104 that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams. The $N_{SS}$ spatial streams may be mapped to a number $N_{STS}$ of space-time streams, which may be mapped to $N_{Tx}$ transmit chains.

APs 102 and STAs 104 that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams may be separately encoded and transmitted in parallel via the multiple $N_{Tx}$ transmit antennas. APs 102 and STAs 104 that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). In the MU-MIMO context, beamforming may additionally, or alternatively, involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on channel state information (CSI) associated with the wireless channels over which the beamformer intends to communicate with the beamformee.

To obtain the CSI used for beamforming, the beamformer may perform a channel sounding procedure with the beamformee. For example, the beamformer may transmit one or more sounding signals (for example, in the form of a null data packet (NDP)) to the beamformee. An NDP is a PPDU without any data field. The beamformee may perform measurements for each of the $N_{Tx} \times N_{Rx}$ sub-channels corresponding to all of the transmit antenna and receive antenna pairs associated with the sounding signal. The beamformee generates a feedback matrix associated with the channel measurements and, in some implementations, compresses the feedback matrix before transmitting the feedback to the beamformer. The beamformer may generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (for example, identify, detect, ascertain, calculate, or compute) how to transmit a signal on each of its antennas to perform beamforming. For example, the steering matrix may be indicative of a phase shift, power level, etc. to use to transmit a respective signal on each of the beamformer's antennas.

A transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions or nulls by increasing the number of transmit antennas. This is especially advantageous in MU transmission contexts in which it may be desirable to reduce inter-user interference.

To improve spatial multiplexing, an AP 102 may support an increased number of spatial streams (such as up to 16 spatial streams). However, supporting additional spatial streams may result in increased CSI feedback overhead. Implicit CSI acquisition techniques may avoid CSI feedback overhead by using the assumption that the UL and DL channels have reciprocal impulse responses (that is, that there is channel reciprocity). For example, the CSI feedback overhead may be reduced using an implicit channel sounding procedure such as an implicit beamforming report (BFR) technique (such as where STAs 104 transmit NDP sounding packets in the UL while the AP 102 measures the channel) because no BFRs are sent. Once the AP 102 receives the NDPs, it may implicitly assess the channels for each of the STAs 104 and use the channel assessments to configure steering matrices. In order to mitigate hardware mismatches that could break the channel reciprocity on the UL and DL (such as the baseband-to-RF and RF-to-baseband chains not being reciprocal), the AP 102 may implement a calibration method to compensate for the mismatch between the UL and the DL channels. For example, the AP 102 may select a reference antenna, transmit a pilot signal from each of its antennas, and estimate baseband-to-RF gain for each of the non-reference antennas relative to the reference antenna.

In some implementations, multiple APs 102 may transmit to one or more STAs 104 at a time utilizing a distributed MU-MIMO scheme. Examples of such distributed MU-MIMO transmissions include coordinated beamforming (CBF) and joint transmission (JT). With CBF, signals (such as data streams) for a given STA 104 may be transmitted by a single AP 102. However, the coverage areas of neighboring APs 102 may overlap, and signals transmitted by a given AP 102 may reach the STAs 104 in OBSSs associated with neighboring APs 102 as OBSS signals. CBF allows multiple neighboring APs 102 to transmit simultaneously while minimizing or avoiding interference, which may result in more opportunities for spatial reuse. More specifically, using CBF techniques, an AP 102 may beamform signals to in-BSS STAs 104 while forming nulls in the directions of STAs 104 in OBSSs such that any signals received at an OBSS STA 104 are of sufficiently low power to limit the interference at the STA 104. To accomplish this, an inter-BSS coordination set may be defined between the neighboring APs 102, which contains identifiers of all APs 102 and STAs 104 participating in CBF transmissions.

With JT, signals for a given STA 104 may be transmitted by multiple coordinated APs 102. For the multiple APs 102 to concurrently transmit data to a STA 104, the multiple APs 102 may all use a copy of the data to be transmitted to the STA 104. Accordingly, the APs 102 may exchange the data among each other for transmission to a STA 104. With JT, the combination of antennas of the multiple APs 102 transmitting to one or more STAs 104 may be considered as one large antenna array (which may be represented as a virtual antenna array) used for beamforming and transmitting signals. In combination with MU-MIMO techniques, the multiple antennas of the multiple APs 102 may be able to transmit data via multiple spatial streams. Accordingly, each STA 104 may receive data via one or more of the multiple spatial streams.

Figure 2:
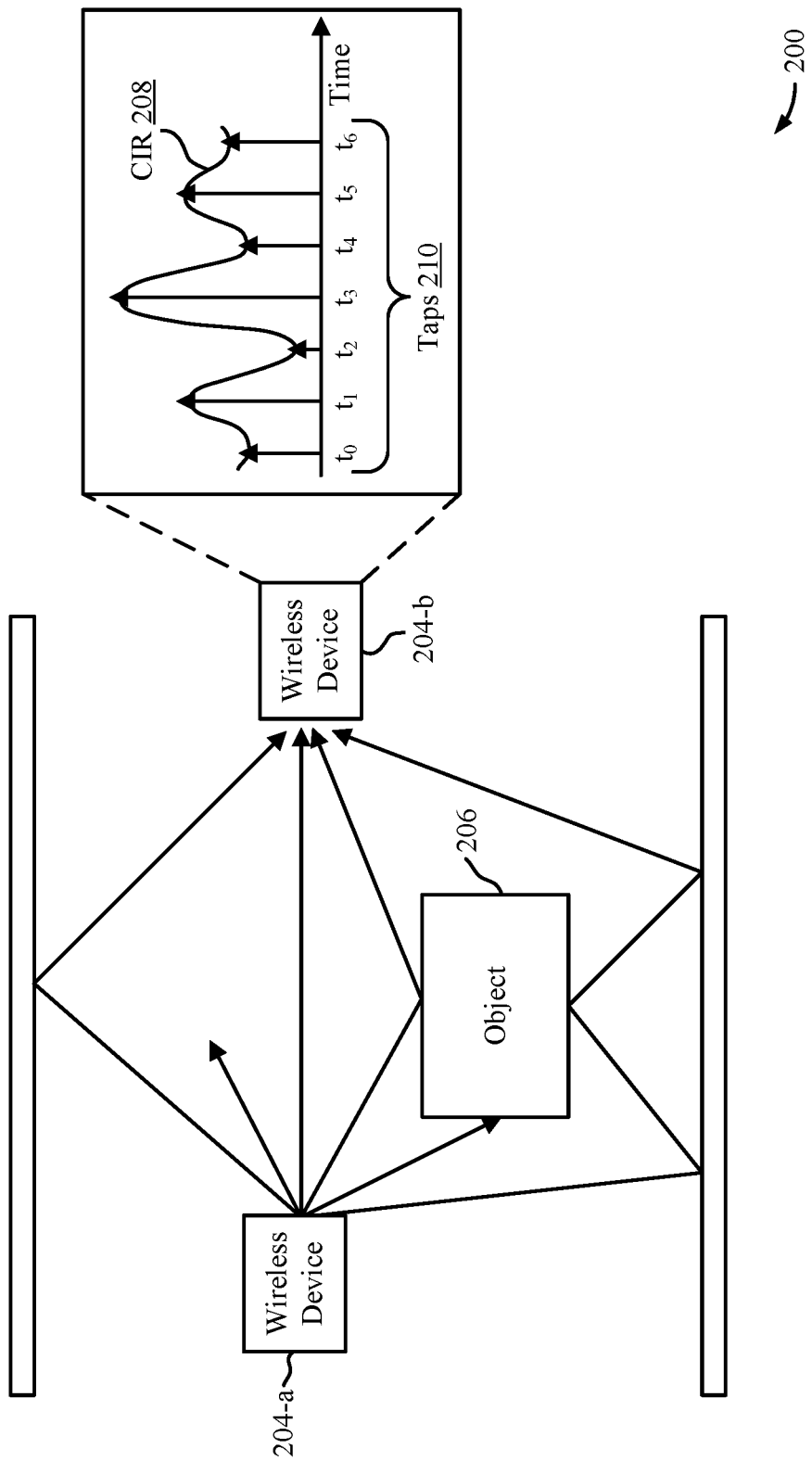
FIG. 2 illustrates an example of a signaling diagram that supports techniques for ACI mitigation for UWB systems according to some aspects of the present disclosure.

FIG. 2 shows an example of a signaling diagram 200 that supports techniques for ACI mitigation for UWB systems according to some aspects of the present disclosure. For example, the signaling diagram 200 may implement or be implemented at one or more aspects the WLAN 100. For example, the signaling diagram 200 may include a wireless device 204-a and a wireless device 204-b, which may be examples of a STAs 104 or an AP 102 illustrated by and described with reference to FIG. 1. The wireless device 204-a (for example, an initiating device, such as a STA 104 or an AP 102) may transmit a signal that is reflected off of the object 206 (such as a user, another human, a body part, an animal, a robot) and other surfaces. The wireless device 204-b (for example, a responding device, such as another STA 104 or another AP 102) may receive the direct signal and reflections of the signal. In other words, the wireless device 204-a may transmit a signal, and the wireless device 204-b may receive reflections of the signal off of one or more objects, including the object 206. The wireless device 204-a and the wireless device 204-b may be examples of UWB wireless devices.

The wireless device 204-b may estimate, from the signal, a CIR 208. In some aspects, based on the CIR 208, reflected signals may be distinguished from the direct signal by strength, time, or other information. The CIR 208 may represent or characterize signals (for example, direct signals, signal reflections from one or more objects) as one or more taps 210. The taps 210 may indicate a strength of one or more signals (for example, direct signals, reflected signals) received at different points in time (such as t0, t1, and so forth). As shown by FIG. 2, the wireless device 204-b may generate the CTR 208 that includes one or more of the taps 210. Each of the taps 210 may refer to an energy rise in the CIR at a point in time (for example, a time instance) or at an occasion that may indicate a direct or reflected signal. In some aspects, one or more of the taps 210 may appear for detected energy that is not part of a direct or reflected signal. For example, one or more of the taps 210 may be due to interfering energy or other noise. That is, one or more of the taps 210 may correspond to interference, such as AC. In other words, one or more of the taps may correspond to a direct signal, a reflected signal (for example, a reflection of the direct signal), or an interfering signal (also referred to as an interferer).

Figure 3:
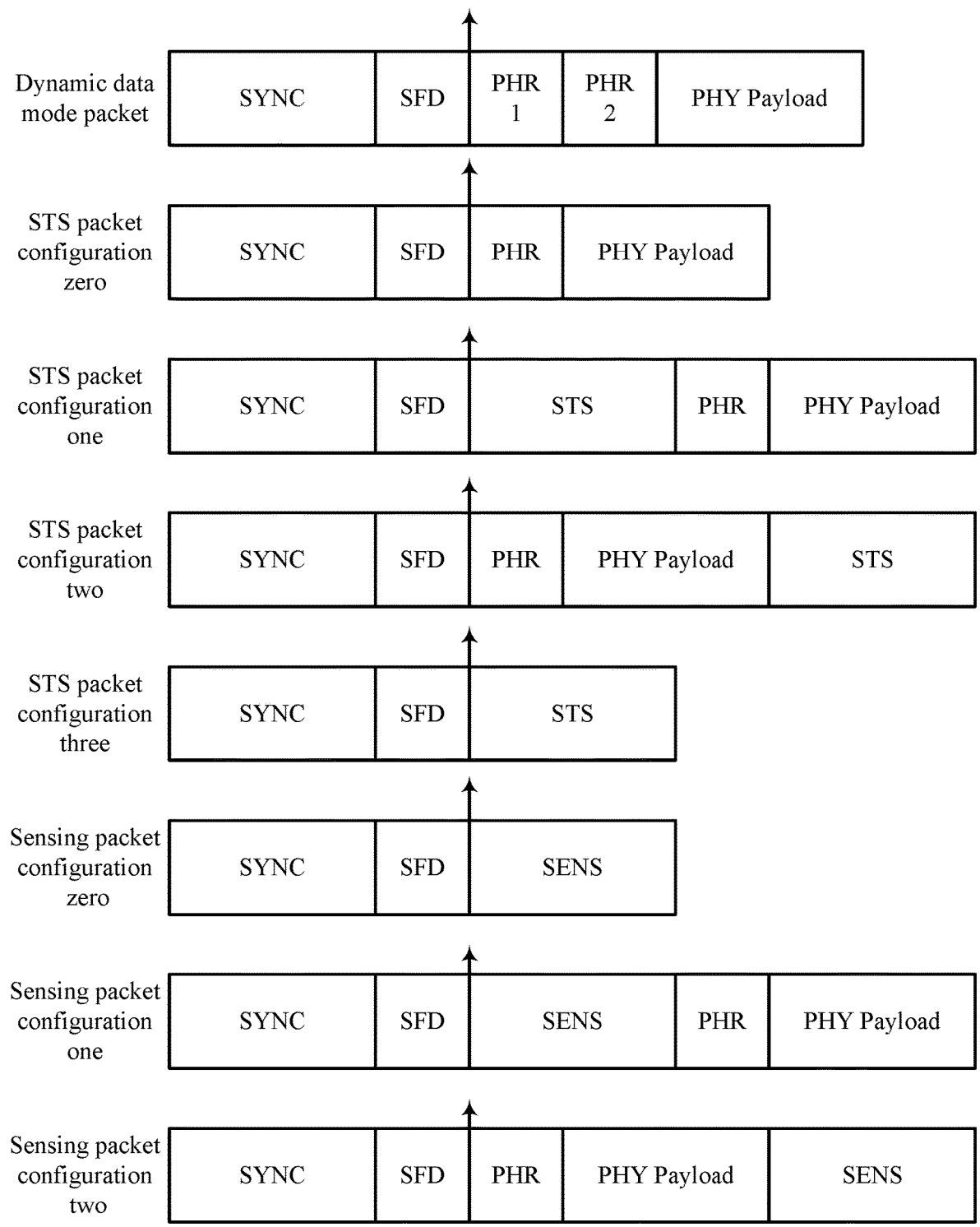
FIG. 3 shows an example of a physical layer protocol data unit (PPDU) that supports techniques for ACI mitigation for UWB systems according to some aspects of the present disclosure.

FIG. 3 shows an example of a PPDU 300 that supports techniques for ACI mitigation for UWB systems according to some aspects of the present disclosure. For example, the PPDU 300 may be implemented at a wireless device, which may be examples of wireless devices illustrated by and described with reference to FIGS. 1 and 2. For example, the wireless devices may be an example of a STA or an AP. In some aspects, the wireless device may be an example of a UWB device. For example, FIG. 3 shows an example PPDU usable for communications between UWB devices. In some aspects, a UWB device may be referred to as an impulse radio UWB (IR-UWB) device. UWB devices may communicate in UWB systems using relatively low power, which may be useful for applications such as secure ranging, sensing (for example presence detection), and high-data rate communications, among other applications.

In some implementations, a first wireless device may transmit different frame structures (example, PPDUs) for UWB communications, where the frame structures may include different fields used for specific functionalities. For example, such PPDUs may include different combinations of a synchronization (SYNC) field, a start of frame delimiter (SFD) field, one or more physical layer (PHY) fields, a PHY payload field, a scrambled timestamp sequence (STS) field, or a sensing (SENS) field.

A SYNC field, included at the beginning of a UWB packet (also referred to as the frame or PPDU described herein) may be used for synchronization between the wireless devices (an initiator and one or more responders). In some aspects, a UWB system may support multiple wireless networks, such as a WPAN, operating on a UWB physical channel. Each wireless network operating on one of the UWB physical channels may be identified by a preamble code. The preamble code may be used to construct symbols that included in the SYNC field. In some aspects, a UWB system may support multiple (for example, two) lengths of preamble codes, such as a length 31 code and length 127 code. In addition, the UWB packet may include an SFD field for time-stamping a transmission, which may be useful for ranging. In some implementations, the UWB packet may include one or more PHR fields (such as a PHR 1, a PHR 2, a PHR field) that may provide PHY information to the one or more responders (for example information about a payload). Additionally, or alternatively, the UWB packet may include a PHY payload field, a scrambled timestamp sequence STS field, or both. The PHY payload field may carry actual data (for example data bits), timestamp information, or other data. The STS field may provide additional information that may increase an accuracy of ranging measurements. In addition, a SENS field of a UWB packet may provide a proper sequence and waveform for high quality RF sensing. In some implementations, the UWB packet may include both payload and SENS fields.

In some implementations, the UWB packet may include a SENS field for scheduling and control of a sensing session between the wireless devices. Sensing may occur in a mono-static, bi-static, or multi-static manner. For example, in a monostatic sensing operation (an example described herein with reference to FIG. 3), a single wireless device (such as a wireless device acting as an initiator and an responder) may transmit a UWB frame, receive a reflection of the UWB packet off of an object (such as a target or a reflector), and estimate characteristics of that object (such as movement, a presence or absence of the object, how far away the object is located from the wireless device, and other characteristics). In some aspects, a wireless device may receive a UWB packet unintended for the wireless device, for example, due to an interfering signal.

Alternatively, in a bi-static or multi-static sensing operation, two or more wireless devices may participate in a sensing operation. In such implementations, a first wireless device may be an initiator and a second wireless device may be an responder, or the second wireless device may be the initiator and the first wireless device may be the responder. For example, as an initiator, the first wireless device may transmit a UWB packet, which may reflect off an object for reception by the second wireless device as an responder such that the second wireless device may estimate the characteristics of the object using sensing.

FIG. 3 shows various examples of PPDUs for a UWB system. For example, a dynamic data mode packet may include a SYNC field, an SFD field, a PHR 1 field, a PHR 2 field, and a PHY payload. An STS packet configuration zero may include a SYNC field, an SFD field, a PHY field, and a PHY payload field. An STS packet configuration one may include a SYNC field, an SFD field, an STS field, a PHR field, and a PHY payload field. An STS packet configuration two may include a SYNC field, an SFD field, a PHR field, a PHY payload field, and an STS field. An STS packet configuration three may include a SYNC field, an SFD field, and an STS field. In addition, a sensing packet configuration zero may include a SYNC field, an SFD field, and a SENS field. A sensing packet configuration one may include a SYNC field, an SFD field, a SENS field, a PHR field, and a PHY payload field. A sensing packet configuration two may include a SYNC field, an SFD field, a PHR field, a PHY payload field, and a SENS field. Other PPDUs or UWB packet formats may be supported.

Figure 4:
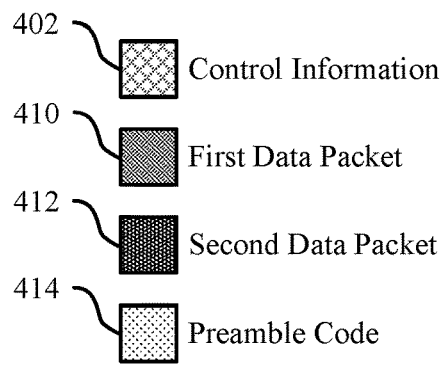
FIG. 4 illustrates an example of a signaling diagram that supports techniques for ACI mitigation for UWB systems according to some aspects of the present disclosure.
Figure 4:
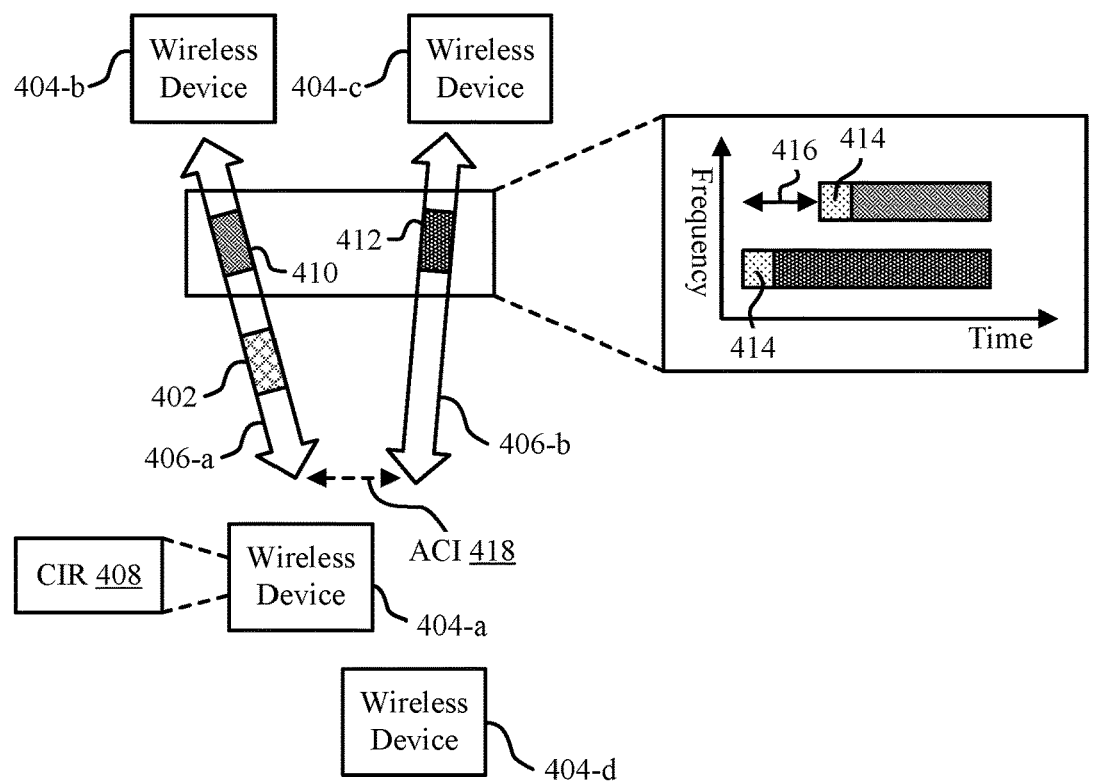

FIG. 4 shows an example of a signaling diagram 400 that supports techniques for ACI mitigation for UWB systems according to some aspects of the present disclosure. For example, the signaling diagram 400 may implement or be implemented at one or more aspects the WLAN 100, the signaling diagram 200, and the PPDU 300. In some implementations, the signaling diagram 400 may include operations at a wireless device 404-a, a wireless device 404-b, and a wireless device 404-c, which may be examples of wireless devices illustrated by and described with reference to FIGS. 1-3. For example, the wireless devices 404 may be examples of STAs or APs. The wireless devices 404 may communicate using one or more communication links 406 (for example, a communication link 406-a a communication link 406-b), which may be examples of a communication link as described with reference to FIG. 1. The signaling diagram 400 may include features for improved communications between the wireless devices 404, among other benefits.

In some aspects, the wireless devices 404 may be examples of UWB devices (for example, IR-UWB) devices. For example, the signaling diagram 400 may illustrated a UWB system that may support multiple UWB channels (for example, UWB physical channels) and a structure for data packets (for example, UWB packets) transmitted using a UWB channel. A bandwidth associated with a UWB channel may be relatively large. Accordingly, the UWB system may support a relatively small quantity of UWB channels. The UWB system may support various data packet structures in accordance with one or more packet configurations illustrated by and described with reference to FIG. 3. For example, The UWB system may support a packet structure that includes a SYNC field whose contents include a preamble code. That is, the SYNC field may include multiple symbols (for example, repetitions of a symbol) that include a preamble code. Accordingly, a SYNC field of a data packet also may be referred to as a preamble.

In some implementations, a wireless device operating within a UWB system may use a preamble code to determine whether the wireless device is an intended receiver of a data packet. As illustrated in the example of FIG. 4, the wireless device 404-a may receive control information 402 from the wireless device 404-b that identifies a preamble code 414 for communications to the wireless device 404-a in the UWB system (for example, via a UWB physical channel). In some implementations, the wireless device 404-a may determine that data packets including the preamble code 414 are intended for the wireless device 404-a. In some implementations, however, the UWB system may support a relatively small quantity of preamble codes for the SYNC field. In other words, UWB transceivers (for example, UWB transmitters, such as the wireless devices 404 or components of the wireless devices 404) may share a relatively small set of preamble codes. Additionally, transmitting devices within the UWB system may not coordinate regarding use of the preamble codes. For example, the wireless device 404-b and the wireless device 404-c may refrain from coordinating preamble codes used for wireless communications with the UWB system. That is, the wireless device 404-b may refrain from informing the wireless device 404-c that the wireless device 404-b selected the preamble code 414 for wireless communications to the wireless device 404-a. As such, multiple (for example, two) UWB transceivers may (for example, unknowingly) use a same preamble code at a same (or similar) time. In addition, because the UWB system may support a relatively small quantity of UWB channels (for example, due to UWB channels having a relatively large bandwidth), a likelihood of the wireless device 404-b and the wireless device 404-c using (for example, selecting) a same preamble for wireless communications via adjacent UWB channels may be relatively high. That is, the wireless device 404-b may transmit, via a first signal, a first data packet 410 to the wireless device 404-a on a UWB channel. At a same or similar time, the wireless device 404-c may transmit, via a second signal, a second data packet 412 to the wireless device 404-d on an adjacent UWB channel. Transmission of the first signal (for example, carrying the first data packet 410) and the second signal (for example, carrying the second data packet 412) on adjacent UWB channels (for example, at a same or similar time) may lead to ACI 418 at the wireless device 404-a (for example, due to power leakage). For example, a sampling rate at the wireless device 404-a may be relatively low, which may lead to aliasing of the second signal. In such an example, while the second signal may be transmitted via an adjacent channel (for example, via an out-of-band channel), the wireless device 404-a may determine that the second signal is an in-band signal (for example, the second signal becoming indistinguishable from the first signal when sampled).

In some implementations, the first data packet 410 and the second data packet 412 may both include the preamble code 414. That is, the wireless device 404-b may include the preamble code 414 in a SYNC field of the first data packet 410 and the wireless device 404-c may include the preamble code 414 in a SYNC field of the second data packet 412. In such examples, the wireless device 404-a may receive (for example, acquire) the second data packet 412 (for example, via the interfering second signal). That is, due to the ACI 418, the wireless device 404-a may receive (for example, and begin processing) the second data packet 412. In other words, the wireless device 404-a (for example, a receiver) may acquire on a relatively strong adjacent-channel UWB interferer with same preamble code (for example, the second signal carrying the second data packet 412) due to the power leakage (for example, the ACI 418). In some implementations, reception of the second data packet 412 (or one or more portions of the second data packet 412) may lead to the wireless device 404-a failing to receive the first data packet 410. For example, a time gap 416 may occur between the first data packet 410 and the second data packet 412, such that the second data packet 412 may arrive at the wireless device 404-a prior to the first data packet 410. That is, the wireless device 404-a may receive the second data packet 412 prior to the first data packet 410. In such an example, the wireless device 404-a may begin processing (for example, decoding) the second data packet 412 and a likelihood of the wireless device 404-a failing to receive (for example, missing) the first data packet 410 (for example, a data packet intended for the wireless device 404-a, a desired in-band preamble) while processing the second data packet 412 (for example, the interferer) may be relatively high.

In some implementations, the wireless device 404-a may implement one or more techniques to reduce (for example, mitigating) interference, such as the ACI 418. For example, the wireless device 404-a may support low-pass filtering. That is, the wireless devices 404 may support one or more ACI mitigation techniques that include (for example, rely on) low-pass filtering of baseband signals, such that the wireless device 404-a (for example, a receiver) may not acquire on the preamble of an interfering signal (for example, the ACI 418). In some implementations, however, an effectiveness of low-pass filtering may be reduced for relatively strong signals, such as UWB signals. In other words, filtering may become ineffective for relatively strong ACI signals. Additionally, or alternatively, because a bandwidth of a UWB signal may be relatively wide, the wireless device 404-*a* may use a relatively narrow low-pass filter. In some implementations, however, relatively narrow filters may distort signals (for example, desired signals), which may lead to sensitivity degradation.

Additionally, or alternatively, the wireless device 404-*a* may detect the presence of an interfering signal (for example, the ACI 418) using one or more portions of a data packet that occur after the preamble (for example, after the SYNC field that includes the preamble code). In other words, the wireless device 404-*a* (for example, a receiver) may detect the presence of the interferer using one or more metrics that may be generated after the preamble. For example, the wireless device 404-*a* may detect the presence of the interfere using one or more metrics generated (for example, at the wireless device 404-*a*) based on an SFD field, which may occur after the SYNC field, or based on a cyclic redundancy check (CRC). Additionally, or alternatively, the wireless device 404-*a* may detect the presence of the interfere using one or more metrics generated (for example, at the wireless device 404-*a*), which may occur at or near to the end of the payload of the data packet. In some implementations, however, using one or more metrics generated (for example, obtained, determined, computed, calculated) after the preamble may increase a likelihood of the wireless device 404-*a* failing to receive a desired data packet, such as the first data packet 410. For example, the preamble code 414 of the first data packet 410 may arrive at the wireless device 404-*a* while the wireless device 404-*a* processes one or more portions of the second data packet 412 (for example, to detect the presence of the ACI 418, to detect the presence of the interferer). As such, the wireless device 404-*a* may fail to receive the first data packet 410. In other words, the preamble of a desired signal may have arrived at the wireless device 404-*a* prior to a time at which the wireless device 404-*a* detects the presence of the ACI 418 (for example, based on one or more metrics generated after the preamble of the second data packet), which may lead to the wireless device 404-*a* failing to receive the desired signal. In some implementations, failing to detect the ACI 418 may reduce a packet error rate performance at the wireless device 404-*a*. For example, a packet error rate performance of a desired signal in the presence of the ACI 418 (for example, with a same power level and preamble code) may be reduced. In other words, if the wireless device 404-*a* fails to detect the ACI 418, the wireless device 404-*a* (for example, a UWB receiver) may process (for example, continue to process) the second data packet 412 (for example, the interferer), and hence, the first data packet 410 (for example, the desired packet) may be missed, which may lead to an increased (for example, relatively high) packet error rate.

In some implementations, the wireless device 404-*a* may support one or more techniques for ACI mitigation for UWB systems, as described herein. For example, the wireless device 404-*a* may support a framework for determining whether a detected signal is due to interference based on an estimated CIR of the signal, or one or more SINR measurements of the signal, or both. In other words, the wireless device 404-*a* may acquire the preamble code 414 of the second data packet 412, which may be processed at the wireless device 404-*a*. That is, the wireless device 404-*a* may receive the second data packet 412 that includes the preamble code 414, via the second signal (for example, in the UWB system). Additionally, the wireless device 404-*a* may estimate a CIR 408 of the second signal (for example, carrying the second data packet 412) and the presence of the ACI 418 may be determined based on an ACI metric derived from the CIR 408, or based on one or more SINR measurements of the second signal. That is, the wireless device 404-*a* may determine an interference metric based on the CIR 408 (for example, the ACI metric). In some aspects, the CIR 408 may be an example of a CIR illustrated by and described with reference to FIG. 2.

For example, the wireless device 404-*a* may estimate the CIR 408 of the signal across the preamble (for example, the SYNC field including the preamble code 414) of the second data packet 412. In some implementations, the wireless device 404-*a* may determine to drop (for example, reject) the second data packet 412 (for example, the acquired interferer preamble) based on the ACI metric derived from the CIR 408 or the one or more SINR measurements of the second signal. That is, the wireless device 404-*a* may process the second data packet 412 based on the determined interference metric. In such examples, the wireless device 404-*a* may determine to transition to (for example, back to) an acquisition state, for example, to monitor for one or more additional data packets, such as the first data packet 410. That is, dropping the second data packet 412 may enable the wireless device 404-*a* to acquire the preamble code 414 of the first data packet 410. In some implementations, detection of ACI via the interference metric (or the one or more SINR measurements) may be relatively insensitive to a transmission power (for example, absolute power) of the second signal (for example, the interferer). In other words, by using the interference metric to detect the presence of an interferer, the wireless device 404-*a* may support detection of relatively strong interferers. Additionally, or alternatively, detection of ACI via the interference metric (or the one or more SINR measurements) may occur over a relatively small duration (for example, may not use a relatively large time separation of the interferer and the desired signal). Some techniques for ACI mitigation may be suitable for nonoverlapping data packets (for example, interferer and the wanted packets that may have an increased or total separation in the time domain). Techniques for ACI mitigation for UWB systems, as described herein, may be suitable for non-overlapping and partially overlapping data packets. For example, techniques for ACI mitigation for UWB systems, as described herein, may be suitable for non-overlapping and partially overlapping preambles.

In some implementations, such ACI mitigation mechanism may enable improved performance for the wireless device 404-*a* in congested environments, such as environments in which UWB devices may be utilizing adjacent channels with a same preamble code (for example, the preamble code 414). For example, techniques for ACI mitigation for UWB systems, as described herein, may enable the wireless device 404-*a* to detect ACI associated with unwanted UWB data packets that may arrive before (for example, slightly before) a wanted UWB packet.

For example, the wireless device 404-*b* may transmit the first data packet 410 (for example, a desired data packet) and the wireless device 404-*c* may transmit the second data packet 412 (for example, a UWB interferer) on an adjacent channel. The first data packet 410 and the second data packet 412 may include a same preamble code (for example, the preamble code 414) and, in some implementations, different payload contents. The second data packet 412 may be transmitted prior to, but may overlap in time with, the first data packet 410. The wireless device 404-*a* may receive the second data packet 412 via the second signal, estimate the CIR 408 of the second signal, determine the interference metric based on the CIR 408, and, in some implementations, refrain from demodulating a remaining portion of the second data packet (for example, a post-preamble portion of the second data packet) based on the determined interference metric. In some implementations, the wireless device 404-*a* may refrain from demodulating (for example, may drop, may reject) one or more data packets if channel taps (also referred to as taps) associated with the one or more data packets and have a same amplitude and a 180 degrees phase difference (for example, +1 and −1). In some implementations, by refraining from demodulating the remaining portion of the second data packet, the wireless device 404-*a* may be able to receive (and successfully decode) the first data packet 410, which may lead to an improved packet error rate performance at the wireless device 404-*a*, among other benefits.

Figure 5:
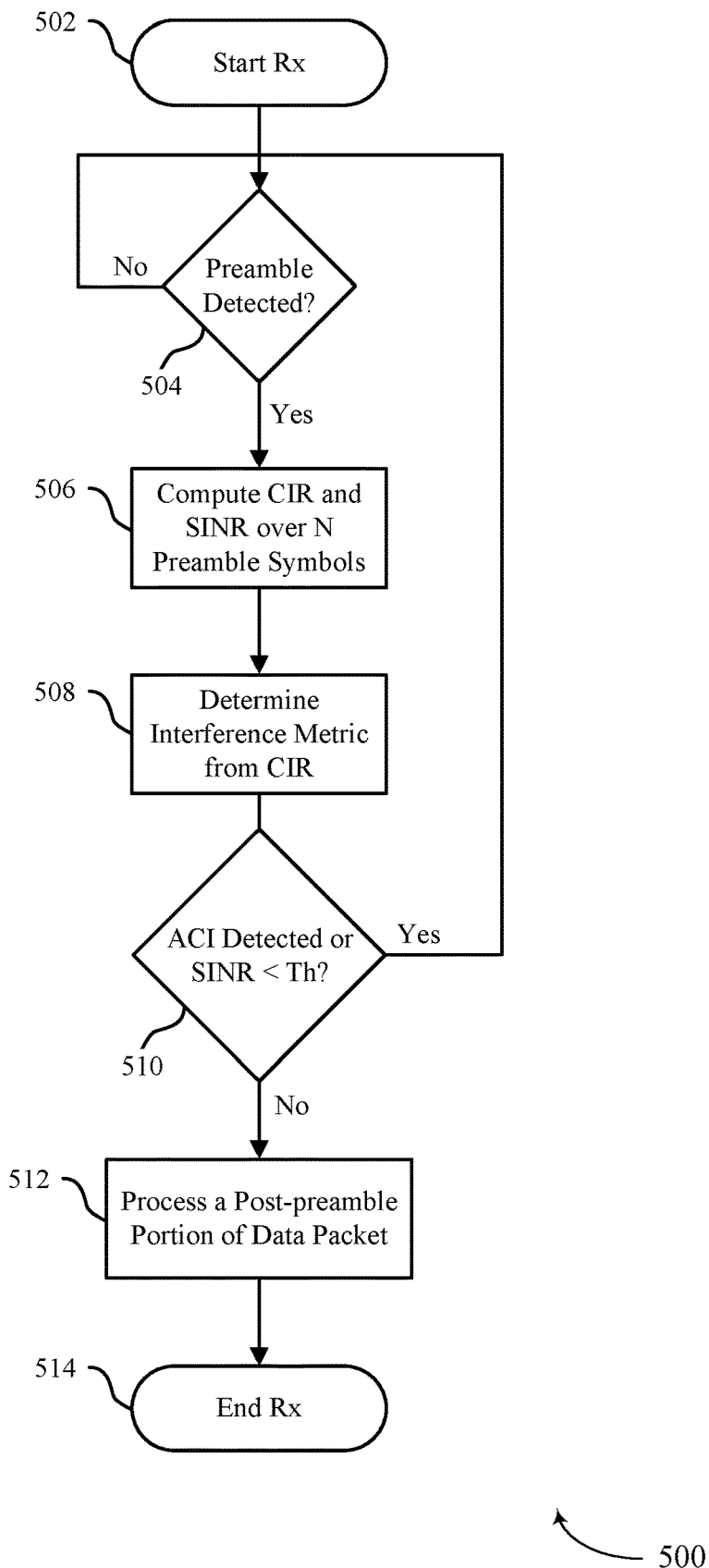
FIGS. 5 and 6 each show a flowchart illustrating an example process performable by a wireless communication device that supports techniques for ACI mitigation for UWB systems according to some aspects of the present disclosure.

FIG. 5 shows an example of a flowchart 500 illustrating an example process performable by a wireless communication device that supports techniques for ACI mitigation for UWB systems according to some aspects of the present disclosure. For example, the flowchart 500 may implement or be implemented at one or more aspects the WLAN 100, the signaling diagram 200, the PPDU 300, and the signaling diagram 400. In some implementations, the flowchart 500 may be implemented at a wireless device, which may be an example of a wireless device illustrated by and described with reference to FIGS. 1-4. For example, the wireless devices may be an example of a STA or an AP illustrated by and described with reference to FIGS. 1-4. In some aspects, the wireless device may be an example of a UWB device (for example, a UWB receiver).

At 502, the wireless device may start receiving (or monitoring for) a data packet. For example, the wireless device may start searching for a preamble (for example, a SYNC field of data packet that includes a preamble code). In some implementations, the preamble may be configured at the wireless device. For example, the wireless device may receive control information (for example, downlink control information (DCI), a radio resource control (RRC) message, a MAC control element (MAC-CE)) that identifies the preamble.

At 504, the wireless device may determine whether the preamble has been detected. For example, the wireless device may receive the data packet via a signal (for example, of a UWB system). The wireless device may determine whether the received data packet includes the preamble (for example, includes the configured preamble code within a SYNC field of the data packet). In some implementations, the wireless device may determine that the data packet lacks the preamble (for example, the SYNC sequence). Accordingly, at 504, the wireless device may determine "No." In such examples, the wireless device may continue to search for the preamble. In some other examples, the wireless device may determine that the data packet includes the preamble (for example, the SYNC sequence). Accordingly, at 504, the wireless device may determine "Yes."

At 506, in response to detecting the preamble, the wireless device may compute a CTR and SINR over N preamble symbols included in the data packet. For example, the received data packet may include a SYNC field that includes multiple symbols of the preamble code (for example, each symbol may include a portion of the preamble code). In other words, the SYNC field may include a sequence of symbols (for example, a SYNC sequence) that corresponds to the preamble code. The wireless device may estimate the CIR for the data packet (for example, the CIR of the signal carrying the data packet) over the N symbols (for example, a quantity of symbols) included in the SYNC field. Additionally, or alternatively, the wireless device may perform one or more SINR measurements over the N of symbols included in the SYNC field to obtain an SINR for the for the data packet (for example, an SINR of the signal carrying the data packet). The SYNC field may be an example of a SYNC field illustrated by and described with reference to FIG. 3.

At 508, the wireless device may determine (for example, compute) an interference metric from the estimated CIR. The interference metric may be an example of an ACI metric. In other words, the interference metric may include a metric usable at the wireless device for detecting ACI. In some implementations, the wireless device may process the data packet based on whether the interference metric satisfies an interference threshold, or whether the SINR satisfies an SINR threshold, or both. For example, the wireless device may demodulate a post-preamble portion of the data packet based on a value of the interference metric not satisfying (or satisfying) an interference threshold, a value of the SINR satisfying (or not satisfying) an SINR threshold, or both. In some other examples, the wireless device may refrain to demodulate a post-preamble portion of the data packet based on a value of the interference metric satisfying (or not satisfying) the interference threshold, a value of the SINR not satisfying (or satisfying) the SINR threshold, or both.

For example, at 510, the wireless device may determine whether ACI is detected, or whether the SINR is less than an SINR threshold (Th), or both. In some implementations, the wireless device may determine whether ACI is detected based on the determined interference metric. Additionally, or alternatively, the wireless device may determine whether the determined SINR is less than the SINR threshold. In some implementations, the wireless device may determine that ACI is detected, or that the SINR is less the SINR threshold, or both. Accordingly, at 510, the wireless device may determine "Yes." In such examples, the wireless device may refrain from processing (for example, demodulating) one or more portions (for example, a post-preamble portion) of the data packet. That is, the wireless device may drop the data packet and continue to search for data packets that include the preamble (for example, at 504). That is, the device may refrain to demodulate a post-preamble portion of the data packet and may monitor for one or more additional data packets that include the preamble based on refraining to demodulate the post-preamble portion of the data packet.

For example, by determining that ACI is detected, the wireless device may determine that the data packet is not intended for the wireless device and, as such, may drop the data packet. In some implementations, an SINR of a data packet unintended for the wireless device may be relatively low over the quantity of preamble symbols or over one or more post-preamble portions of the data packet (for example, one or more portions of the data packet that occur after the SYNC field). For example, during one or more portions of another field, such as an SFD field, the SINR of a data packet unintended for the wireless device may be relatively low. Accordingly, in response to determining that the SINR of the signal is below the SINR threshold, the wireless device may drop the data packet carried via the signal.

In some other examples, the wireless device may determine that ACI is not detected, or that an SINR of the signal is greater than the SINR threshold, or both. That is, at 510, the wireless device may determine "No." In some implementations, the wireless device may determine that ACI is detected, but that an SINR of the signal is greater than the SINR threshold. In such implementations, at 510, the wireless device also may determine "No."

At 512, the wireless device may process a post-preamble portion of the data packet. For example, the wireless device may demodulate the post-preamble portion (or one or more other remaining portions of the data packet).

At 514, the wireless device may end reception. In some implementations, the wireless device may end reception based on demodulating the post-preamble portion of the data packet (for example, at 512).

Figure 6:
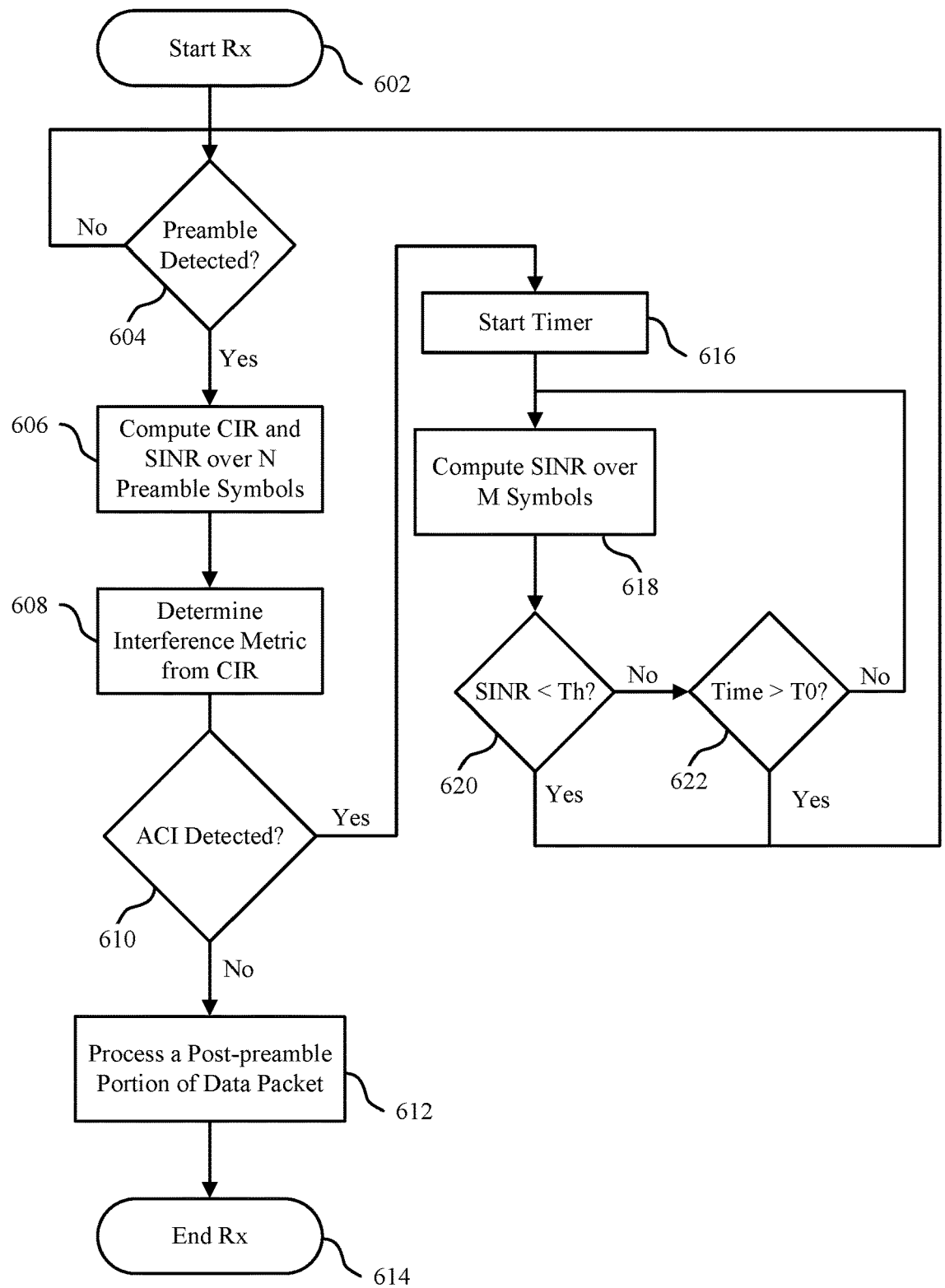

FIG. 6 shows an example of a flowchart 600 illustrating an example process performable by a wireless communication device that supports techniques for ACI mitigation for UWB systems according to some aspects of the present disclosure. For example, the flowchart 600 may implement or be implemented at one or more aspects the WLAN 100, the signaling diagram 200, the PPDU 300, the signaling diagram 400, and the flowchart 500. In some implementations, the flowchart 600 may be implemented at a wireless device, which may be an example of a wireless device illustrated by and described with reference to FIGS. 1-5. For example, the wireless devices may be an example of a STA or an AP. In some aspects, the wireless device may be an example of a UWB device (for example, a UWB receiver).

At 602, the wireless device may start receiving (or monitoring for) a data packet. For example, the wireless device may starts searching for a preamble (for example, a SYNC field of data packet that includes a preamble code). In some implementations, the preamble may be configured at the wireless device. For example, the wireless device may receive control information (for example, DCI, an RRC message, a MAC-CE) that identifies the preamble.

At 604, the wireless device may determine whether the preamble has been detected. For example, the wireless device may receive a data packet via a signal (for example, of a UWB system). The wireless device may determine whether the received data packet includes the preamble (for example, includes the configured preamble code within a SYNC field of the data packet). In some implementations, the wireless device may determine that the data packet lacks the preamble (for example, the SYNC sequence). That is, at 504, the wireless device may determine "No." In such examples, the wireless device may continue to search for the preamble. In some other examples, the wireless device may determine that the data packet includes the preamble (for example, the SYNC sequence). That is, at 504, the wireless device may determine "Yes."

At 606, in response to detecting the preamble, the wireless device may compute a CTR and SINR over N preamble symbols included in the data packet. That is, the received data packet may include a SYNC field that includes the preamble code. The wireless device may estimate the CIR for the data packet (for example, the CTR of the signal carrying the data packet) over a quantity (N) of symbols included in the SYNC field. Additionally, or alternatively, the wireless device may perform one or more SINR measurements over the quantity (N) of symbols included in the SYNC field to obtain an SINR for the for the data packet (for example, an SINR of the signal carrying the data packet). The SYNC field may be an example of a SYNC field illustrated by and described with reference to FIG. 3.

At 608, the wireless device may determine (for example, compute) an interference metric from the estimated CIR. The interference metric may be an example of an ACI metric. In other words, the interference metric may include a metric usable at the wireless device for detecting ACI.

At 610, the wireless device may determine whether ACI is detected. For example, the wireless device may determine whether ACI is detected based on the determined interference metric. In some implementations, the wireless device may determine whether ACI is detected based on whether a value of the interference metric satisfies an interference threshold.

In some implementations, the wireless device may determine that ACI is not detected. For example, the wireless device may determine that a value of the interference metric satisfies (for example, exceeds, is greater than) the interference threshold. Accordingly, at 610, the wireless device may determine "No." In such examples, at 612, the wireless device may process a post-preamble portion of the data packet. For example, the wireless device may demodulate the post-preamble portion (or one or more other remaining portions of the data packet). At 614, the wireless device may end reception. In some implementations, the wireless device may end reception based on demodulating the post-preamble portion of the data packet (for example, at 612).

In some other examples, the wireless device may determine that ACI is detected. For example, the wireless device may determine that a value of the interference metric fails to satisfy (for example, fails to exceed, is less than) the interference threshold. Accordingly, at 610, the wireless device may determine "Yes." In such examples, at 616, the wireless device may start a timer. That is, the wireless device may initiate a time in response to determining that ACI is detected (for example, at 610). In other words, the wireless device may initiate the timer in response to the value of the interference metric being less than the interference threshold (for example, failing to satisfy the interference threshold, not satisfying the interference threshold).

At 618, the wireless device may compute SINR over a first set of M symbols. In some implementations, the first set of M symbols may include one or more of the N preamble symbols used for computing the CIR. In some other examples, the first set of M symbols may occur subsequent to the N preamble symbols. For example, the N preamble symbols may occur within the SYNC field and the first set of M symbols may occur with the SYNC field or another field of the data packet, such as the SFD field. A value of M may be greater than, equal to, or less than, a value of N. In other words, the wireless device may determine a first value of the SINR across a portion of the preamble of the data packet (for example, across M preamble symbols) based on ACI being detected (for example, based on the value of the interference metric failing to satisfy the interference threshold). In some implementations, processing the data packet may be based on whether the first value of the SINR fails to satisfy (for example, fails to exceed, is less than) an SINR threshold (Th).

For example, at 620, the wireless device may determine whether the SINR determined over the first set of M symbols is less than the SINR threshold (Th). In some implementations, the wireless device may determine that the first value of the SINR is less the SINR threshold (for example, that the first value of the SINR fails to satisfy the SINR threshold). Accordingly, at 620, the wireless device may determine "Yes." In such examples, the wireless device may refrain from processing (for example, demodulating) one or more portions (for example, a post-preamble portion) of the data packet. That is, the wireless device may drop the data packet and continue to search for the preamble (for example, at

604). In other words, the wireless device may refrain to demodulate a post-preamble portion of the data packet based on the first value of the SINR not satisfying the SINR threshold.

In some other examples, the wireless device may determine that the SINR is greater than the SINR threshold (for example, that the first value of the SINR satisfies the SINR threshold). Accordingly, at 620, the wireless device may determine "No." In such examples, at 622, the wireless device may determine whether a duration of the timer satisfies (for example, exceeds, is greater than) a time threshold (TO). In some implementations, the wireless device may determine that the duration of the timer is less than the time threshold. Accordingly, at 620, the wireless device may determine "No." In such examples, the wireless device may compute a second value of the SINR over a second set of M symbols. For example, the wireless device may compute the second SINR over M symbols (for example, a next M symbols) that occur after the first set of M symbols. In some implementations, the first set of M symbols may occur within the SYNC field and the second set of M symbols may occur within the SYNC field or another field of the data packet, such as the SFD field.

In some other examples, the wireless device may determine that the duration of the timer is greater than the time threshold. Accordingly, at 622, the wireless device may determine "Yes." In such examples, the wireless device may refrain from processing (for example, demodulating) one or more portions (for example, a post-preamble portion) of the data packet. For example, the wireless device may drop the data packet and continue to search for the preamble (for example, at 604). In other words, the wireless device may refrain to demodulate a post-preamble portion of the data packet based on the first value of the SINR being greater than (for example, satisfying) the SINR threshold and a duration of the timer satisfying (for example, exceeding) the time threshold. In some implementations, by determining one or more values of the SINR of over the duration of the timer, the wireless device may track the ACI. As such, the wireless device may determine a suitable time to continue to search for (for example, reacquire) the preamble. In some implementations, tracking the ACI may reduce a likelihood that the wireless device may acquire a preamble of an unintended data packet multiple times.

Figure 7:
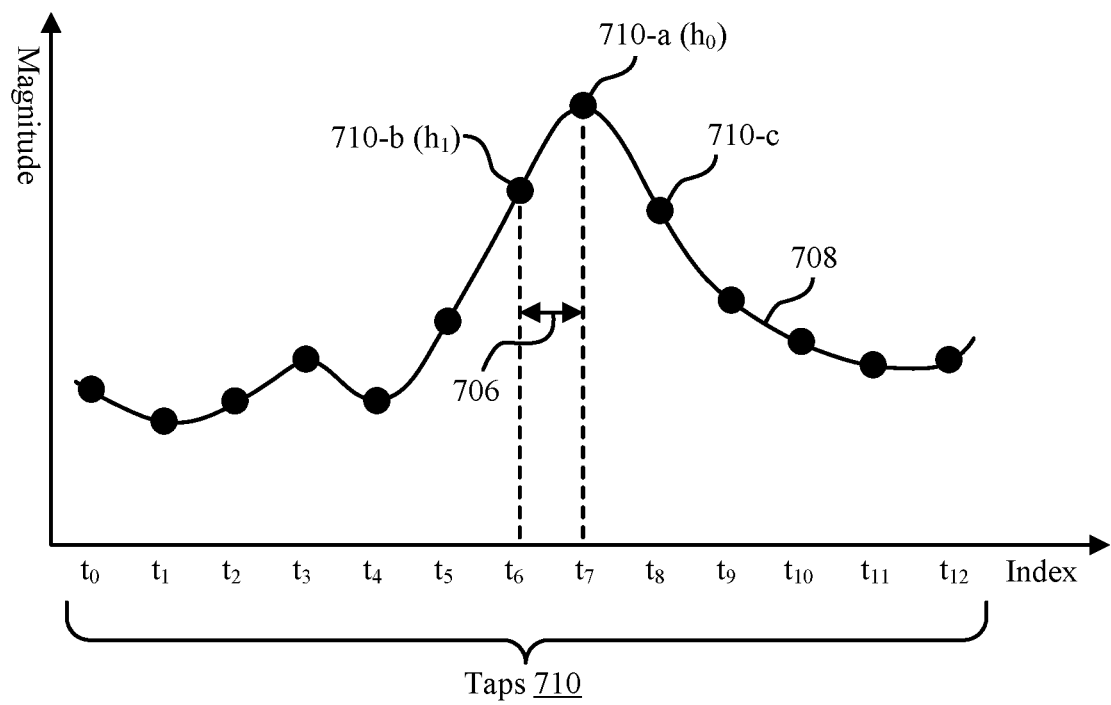
FIG. 7 shows an example of a channel impulse response (CIR) diagram illustrating an example CIR usable by a wireless communication device that supports techniques for ACI mitigation for UWB systems according to some aspects of the present disclosure.

FIG. 7 shows an example of a CIR diagram 700 illustrating an example CIR usable by a wireless communication device that supports techniques for ACI mitigation for UWB systems according to some aspects of the present disclosure. For example, the CIR diagram 700 may implement or be implemented at one or more aspects the WLAN 100, the signaling diagram 200, the PPDU 300, the signaling diagram 400, the flowchart 500, and the flowchart 600. In some implementations, the CIR diagram 700 may be implemented at a wireless device, which may be an example of a wireless devices illustrated by and described with reference to FIGS. 1-6. For example, the wireless device may be an example of a UWB device (for example, an IR-UWB device). The wireless device may support wireless communication via one or more UWB channels (for example, UWB physical channels). In some implementations, multiple wireless devices operating within a UWB system (for example, including the wireless device) may operate on adjacent UWB channels. That is, the use of adjacent UWB channels may be permitted within the UWB system. The use of adjacent UWB channels may lead to ACI In some implementations, the wireless device may employ one or more ACI mitigation techniques to reduce ACI, such as low-pass filtering, or payload checks (for example, CRC checks), or both. In some implementations, however, low-pass filtering may lead to sensitivity degradation and use of the payload (or other portions of a data packet that may occur after the preamble) may degrade packet error rate performance.

In some implementations, the wireless device may support a framework for determining whether a detected signal is due to interference (for example, ACI) based on an estimated CIR of the signal. For example, the wireless device may be configured to determine an ACI metric (for example, a metric indicative of ACI) based on an estimated CTR. In some implementations, the wireless device may determine the ACI metric using an ACI metric computation algorithm that is based on CIR. That is, an input for the ACI metric computation algorithm may be based on an estimated CIR of a signal.

For example, the wireless device may be configured with a preamble code for wireless communications to the wireless device within the UWB system. The wireless device may receive control signaling identifying the preamble code, or the wireless device may be otherwise configured with the preamble code. The wireless device may receive a data packet via a signal on a UWB channel. The wireless device may determine that the data packet includes the preamble code. That is, the wireless device may detect (for example, acquire) the preamble code. For example, the data packet may include a SYNC field that includes one or symbols (for example, preamble symbols) that include the preamble code. That is, the SYNC field of the data packet, which also may be referred to as the preamble of the data packet, may include a sequence of symbols that include the preamble code. In other words, the data packet may include a SYNC sequence of the preamble code.

The wireless device may estimate (for example, compute determine) a CIR 708 of the signal carrying the data packet. The CIR 708 may be an example of a CIR illustrated by and described with reference to FIGS. 2-6. For example, the wireless device may estimate the CIR 708 over (for example, across, using) a quantity (for example, N) of preamble symbols. The CIR 708 may include one or more taps 710 (also referred to as channel taps), which may be examples of taps illustrated by and described with reference to FIG. 2. For example, a tap the taps 210 may refer to an energy rise in the CIR 708 at a point in time (for example, at a time instance) or at an occasion that may indicate a direct or reflected signal.

The CIR 708 may represent or characterize the received signal as one or more taps 710. The taps 710 may be an example of taps illustrated by and described with reference to FIG. 2. For example, the taps 710 may indicate a strength of one or more signals (for example, direct signals, reflected signals, interfering signals) received at different (such as t0, t1, and so forth). In some implementations, the wireless device may index the taps 710 based on the respective time point of each of the taps 710. That is, a respective index associated with a tap (for example, each of the taps 710) may correspond to a time point associated with the tap. For example, the wireless device may sample the CIR 708 to obtain the taps 710 at various time points. Accordingly, each of the taps 710 may refer to an energy rise in the CIR 708 at a point in time (for example, a time instance) or at an occasion. As such, each of the taps 710 may indicate a presence of a signal, such as a direct signal, a reflected signal (for example, a reflection of the direct signal), or an interfering signal (also referred to as an interferer) at a respective time point. In some implementations, the wireless device may sample the CIR 708 based on a chip duration ($T_{chip}$), which may be about 2 nanoseconds (ns) or some other suitable duration. For example, the wireless device may sample the CIR 708 such that a duration 706 between two consecutive taps may correspond to half of a chip duration (for example, may correspond to $T_{chip}/2$). In such an example, the input for the ACI metric computation algorithm may include one or more CIR estimates ($h_i$) spaced at the half chip duration (for example, spaced in accordance with the duration 706, spaced by about 1 ns or some other suitable duration). In some implementations, the input may include one or more of the taps 710 that have relatively large magnitude. For example, the wireless device may identify (for example, find) a tap with a largest magnitude among the taps 710. In other words, the wireless device may select one of the taps 710 based on a respective magnitude of each of the taps 710. In some implementations, the tap with the largest magnitude among the taps 710 may be referred to as $h_0$. That is, the tap with the largest magnitude among the taps 710 ($h_0$) may correspond to a strongest signal path among the taps 710 (for example, a strong signal among the signals represented via the CIR 708, which may be a direct signal, a reflected signal, or an interferer). As illustrated in the example of FIG. 7, the wireless device may select a tap 710-$a$ ($h_0$) from the taps 710 based on a value of the tap 710-$a$ being greater than a respective value of each remaining taps of the taps 710. The wireless device may identify (for example, find, determine) one or more of the taps 710 that are neighboring to (for example, adjacent in time to) the tap 710-$a$. For example, the wireless device may determine that a tap 710-$b$ and a tap 710-$c$ neighbor (for example, are neighbors of) the tap 710-$a$ ($h_0$). The wireless device may identify a tap with a largest magnitude among the two neighbors of $h_0$. In some implementations, the tap with the largest magnitude among the two neighbors of $h_0$ may be referred to as $h_1$. That is, the wireless device may identify a tap with a largest magnitude among the two neighbors of the tap 710-$a$. For example, the wireless device may select the tap 710-$b$ from among the tap 710-$b$ and the tap 710-$c$ based on the tap 710-$b$ and the tap 710-$c$ being adjacent to the tap 710-$a$ in time, and based on a value of the tap 710-$b$ being greater than a value of the tap 710-$c$.

In other words, the wireless device may identify a subset of the taps 710 that includes a tap with the largest magnitude among the taps 710 and two taps that are neighboring to the tap with the largest magnitude among the taps 710. Accordingly, the subset of the taps 710 includes three consecutive taps in time. As illustrated in the example of FIG. 7, the subset of the taps 710 may include the tap 710-$a$, the tap 710-$b$, and the tap 710-$c$. The wireless device may select the tap with the largest magnitude among the taps 710 (and therefore also among the subset of the taps 710), which may be referred to as $h_0$. As illustrated in the example of FIG. 7, the tap 710-$a$ corresponds to $h_0$. The wireless device may select the tap with a next largest magnitude among the subset of the taps 710, which may be referred to as $h_1$. As illustrated in the example of FIG. 7, the tap 710-$b$ corresponds to $h_1$. That is, the wireless device may order the subset of the taps 710 based on respective magnitude of each tap within the subset of the taps 710, such that a first tap may be the tap 710-$a$ ($h_0$) and a second tap may be the tap 710-$b$ ($h_1$).

The wireless device may determine the interference metric (also referred to as a decision metric) based on the tap 710-$a$ ($h_0$) and the tap 710-$b$ ($h_1$). For example, the wireless device may determine (for example, compute) the decision metric ($\gamma$) in accordance with the following Equation 1:

$$\gamma = \text{Re}\{h_0 h_1^*\} \quad (1)$$

in which $h_1^*$ may correspond to a conjugate of $h_1$. In some implementations, the wireless device may determine that ACI is detected if a value of $\gamma$ fails to satisfy an interference threshold (for example, if $\gamma<0$). For example, $h_0$ and $h_1$ may each represent a respective amplitude and phase (for example, a respective complex number, a respective channel gain, a respective complex gain) of the corresponding tap. In such an example, $\gamma$ may correspond to a real part of $h_0$ multiplied by $h_1^*$ (for example, $h_1$ conjugate). Accordingly, a value of $\gamma$ may represent a phase difference between $h_0$ and $h_1$. For example, if the phase difference between $h_0$ and $h_1$ is less than 90 degrees, a value of $\gamma$ may be positive. Additionally, if the phase difference between $h_0$ and $h_1$ is greater than 90 degrees, a value of $\gamma$ may be negative. Accordingly, the wireless device may determine that ACI is detected if a value of $\gamma$ is negative (for example, if $\gamma<0$). In other words, the wireless device may determine that ACI is detected if a value of the interference metric ($\gamma$) is less than the interference threshold. That is, the wireless device may determine that ACI is detected if a value of the interference metric ($\gamma$) does not satisfy the interference threshold. For example, if $h_0$ and $h_1$ correspond to a same signal (for example, a direct path of a signal and a reflection of a same signal) $h_0$ and $h_1$ may be correlated and correlated signals may have a same or relatively similar phase. That is, a phase difference between correlated signals may be relatively low (for example, less than about 90 degrees). In other words, if the phase difference between $h_0$ and $h_1$ is less than a phase difference threshold (for example, about 90 degrees), the wireless device may determine that $h_0$ and $h_1$ have a same or relatively similar propagation path. Accordingly, if a phase difference between $h_0$ and $h_1$ is greater than the phase difference threshold (for example, about 90 degrees), the wireless device may determine that $h_0$ and $h_1$ are uncorrelated. As such, the wireless device may determine that $h_0$ and $h_1$ have different propagation paths. In other words, the wireless device may determine that ACI is not detected if a value of a phase difference metric ($\gamma'$) is greater than the phase difference threshold. The phase difference metric may be determined in accordance with the following Equation 2:

$$\gamma' = \angle h_0 h_1^*. \quad (2)$$

The wireless device may determine that ACI is detected if a value of the phase difference metric ($\gamma'$) satisfies the phase difference threshold. In some implementations, using the decision metric ($\gamma$) or the phase difference metric ($\gamma'$) to detect a presence of ACI may lead to a reduced packet error rate, among other benefits.

Figure 8:
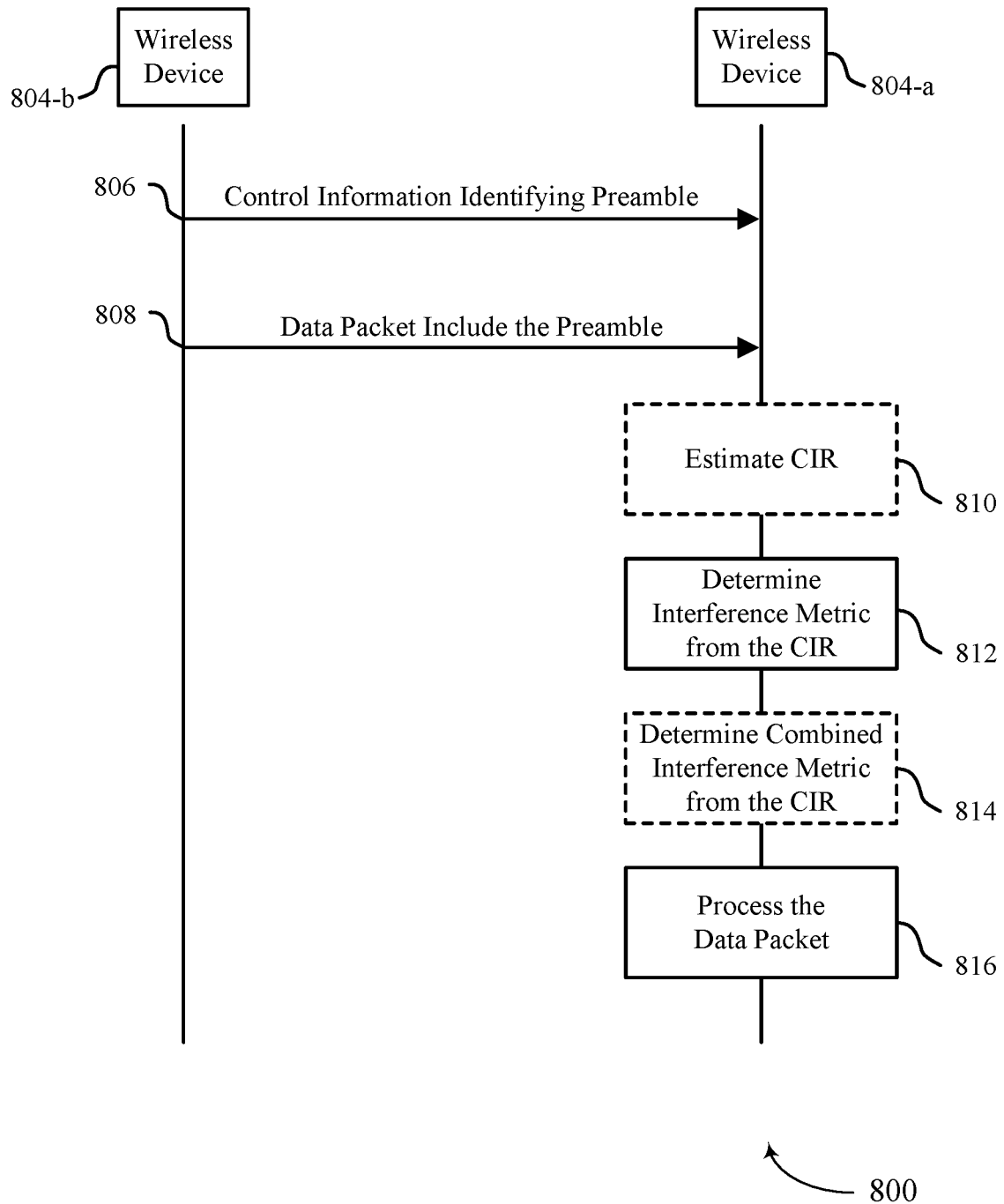
FIG. 8 shows an example of a process flow illustrating an example process performable by a wireless communication device e that supports techniques for ACI mitigation for UWB systems according to some aspects of the present disclosure.

FIG. 8 shows an example of a process flow 800 illustrating an example process performable by a wireless communication device that supports techniques for ACI mitigation for UWB systems according to some aspects of the present disclosure. For example, the process flow 800 may implement or be implemented at one or more aspects the WLAN 100, the signaling diagram 200, the PPDU 300, the signaling diagram 400, the flowchart 500, the flowchart 600, and the CIR diagram 700. In some implementations, the process flow 800 may include operations at a wireless device 804-*a* and a wireless device 804-*b*, which may be examples of wireless devices illustrated by and described with reference to FIGS. 1-8. For example, the wireless devices 804 may be examples of STAs or APs. In the example of FIG. 8, the wireless devices 804 may operate within a UWB system. In the following description of the process flow 800, the operations between the wireless devices 804 may occur in a different order than the example order shown. Additionally, or alternatively, the operations performed by the wireless devices 804 may be performed in different orders or at different times. Some operations also may be omitted or combined. The operations performed by the wireless devices 804 may support improvements to communications between the wireless devices 804, among other benefits.

At 806, the wireless device 804-*a* may receive control information that identifies a preamble. The control information may be an example of control information illustrated by and described with reference to FIG. 4. For example, the control information may include DCI, an RRC message, or a MAC-CE. The preamble may be an example of a preamble illustrated by and described with reference to FIG. 4. For example, the preamble may be an example of a preamble code (for example, SYNC sequence) included in a SYNC field.

At 808, the wireless device 804-*a* may receive, via a signal in the UWB system, a data packet that includes the preamble. The data packet may be an example of a data packet illustrated by and described with reference to FIG. 3. For example, the data packet may have a structure in accordance with one of the configurations illustrated in the example of FIG. 3.

In some implementations, at 810, the wireless device 804-*a* may estimate a CIR of the signal (for example, the signal carrying the data packet). In some implementations, the wireless device 804-*a* may estimate the CIR over a portion (for example, N preamble symbols) included in the data packet. That is, the received data packet may include a SYNC field (for example, a preamble), and the wireless device 804-*a* may estimate the CIR over one or more of the symbols included in the SYNC field.

At 812, the wireless device 804-*a* may determine (for example, compute) an interference metric from the estimated CIR. The interference metric may be an example of an ACI metric. In other words, the interference metric may include a metric usable at the wireless communication device for detecting ACI.

In some implementations, at 814, the wireless device 804-*a* may determine (for example, compute) a combined interference metric that is based on multiple estimated CIRs of the signal across multiple antennas. For example, the wireless device 804-*a* (for example, a UWB device) may include multiple receive antennas (for example, receive chains). In such an example, the wireless device 804-*a* may determine a respective value of the interference metric (which may be an example of a decision metric ($\gamma$) described with reference to FIG. 7) for each receive chain. That is, the wireless device 804-*a* may compute $\gamma_m$, in which a value of m may correspond to an antenna (or receive chain) index. In other words, the wireless device may estimate multiple CIRs and a CIR (for example, each estimated CIR) may correspond to a respective antenna of the plurality of antennas. The wireless device may determine an interference metric for each of the multiple CIRs and compute a summation (for example, the combined interference metric) of the determined interference metrics to obtain the combined interference metric. In other words, combined interference metric (for example, an overall decision metric) may be a summation of multiple interference metrics (for example, all decision metrics). For example, the wireless device 804-*a* may determine the combined interference metric in accordance with the following Equation 3:

$$\gamma = \sum_{m=0}^{M-1} \gamma_m \quad (3)$$

in which M may correspond to a quantity of receive antennas at the wireless device 804-*a*. In such an example, the wireless device 804-*a* may determine that ACI is detected if a value of the combined interference metric is less than the interference threshold (for example, if $\gamma<0$). In other words, the wireless device 804-*a* may determine that ACI is detected if a value of the combined interference metric does not satisfy the interference threshold.

At 816, the wireless device 804-*a* may process the data packet based on the interference metric. For example, the wireless device 804-*a* may determine that ACI is not detected and, in response, may demodulate a post-preamble portion (or one or more other remaining portions of the data packet) of the data packet. In some other examples, the wireless device 804-*a* may determine that ACI is detected and, in response, may perform one or more operations illustrated in accordance with FIGS. 5 and 6. For example, the wireless device may refrain to demodulate a post-preamble portion (or one or more other remaining portions of the data packet) of the data packet and may monitor for one or more additional data packets that include the preamble (for example, based on refraining to demodulate the post-preamble portion of the data packet) Additionally, or alternatively, the wireless device 804-*a* may initiate a timer and compute SINR over one or more set of M symbols. In some other examples, the wireless device 804-*a* may output an indication of the estimated CIR (or the multiple CTR estimates), or a value of an SINR, or both, for use by an application of the wireless device 804-*a* in a determination of whether to drop the data packet (for example, whether to refrain to demodulate the post-preamble portion of the data packet). That is, the wireless device 804-*a* may refrain from determining whether ACI is detected during the processing of the preamble (for example, and may therefore continue to process post-preamble parts of the packet). Additionally, the wireless device 804-*a* may provide the CIR estimated using the preamble (for example, the preamble CIR) and or the SINR determined based on the preamble (for example, the preamble SINR) to an application, such as an application run on the wireless device 804-*a* or to an application running on another device (for example, an application server). The application (for example, a device hosting the application) may determine the interference metric and, if either of the interference metric or the SINR are available and fail to satisfy respective thresholds, the application may drop the data packet. In some implementations, processing a data packet based on the interference metric may lead to improved packet error rate performance at the wireless device 804-*a*, among other benefits.

Figure 9:
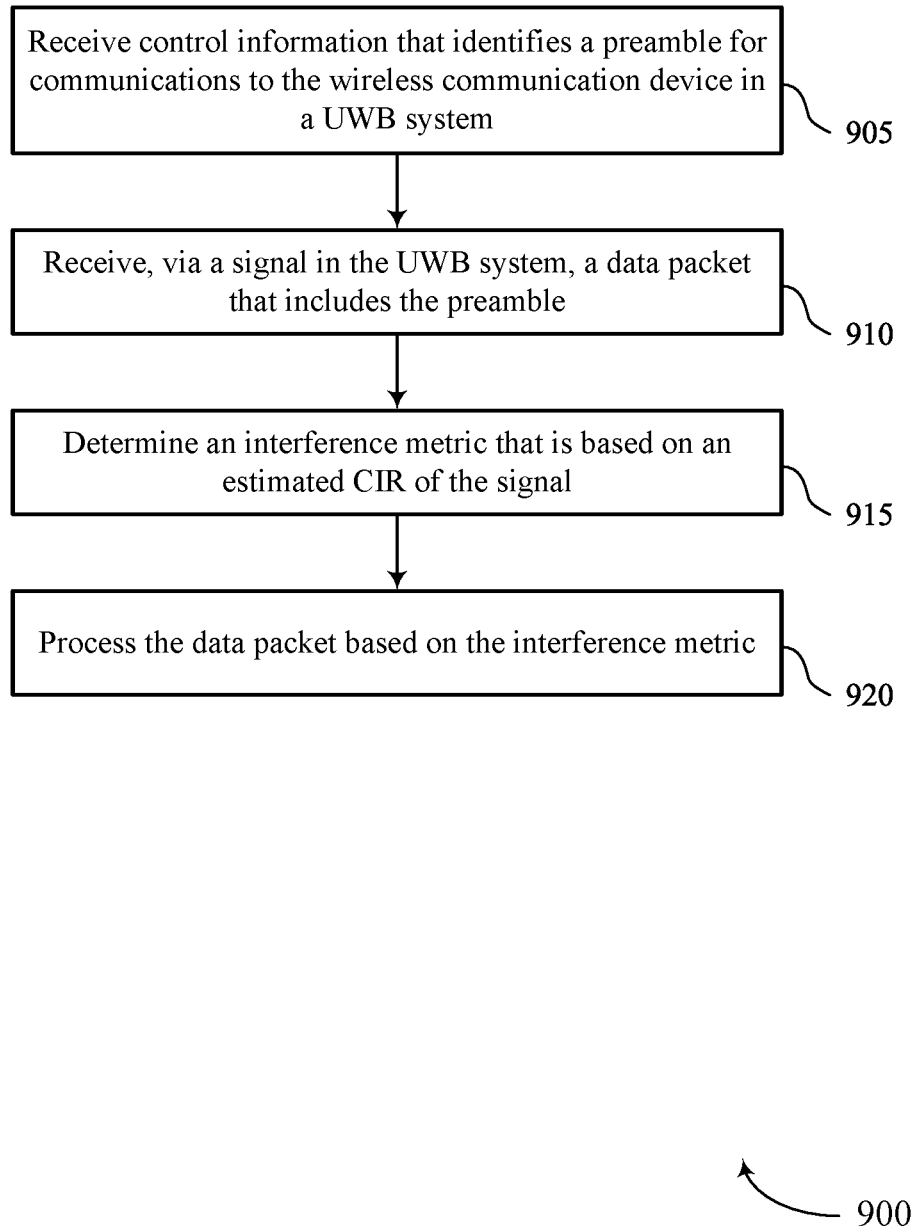
FIG. 9 shows a flowchart illustrating an example process performable by a wireless communication device that supports techniques for ACI mitigation for UWB systems according to some aspects of the present disclosure.

FIG. 9 shows a flowchart illustrating a method 900 that supports ACI mitigation for UWB systems in accordance with one or more aspects of the present disclosure. The operations of the method 900 may be implemented by an AP or a STA or its components as described herein. For example, the operations of the method 900 may be performed by an AP or a STA as described with reference to FIGS. 1-10. In some implementations, an AP or a STA may execute a set of instructions to control the functional elements of the wireless AP or the wireless STA to perform the described functions. Additionally, or alternatively, the wireless AP or the wireless STA may perform aspects of the described functions using special-purpose hardware.

In some implementations, in block 905, the wireless AP or the wireless STA may receive control information that identifies a preamble for communications to the wireless communication device in an UWB system. The operations of block 905 may be performed in accordance with examples as disclosed herein. In some implementations, aspects of the operations of block 905 may be performed by a preamble identification component 1025 as described with reference to FIG. 10.

In some implementations, in block 910, the wireless AP or the wireless STA may receive, via a signal in the UWB system, a data packet that includes the preamble. The operations of block 910 may be performed in accordance with examples as disclosed herein. In some implementations, aspects of the operations of block 910 may be performed by a preamble component 1030 as described with reference to FIG. 10.

In some implementations, in block 915, the wireless AP or the wireless STA may determine an interference metric that is based on an estimated CIR of the signal. The operations of block 915 may be performed in accordance with examples as disclosed herein. In some implementations, aspects of the operations of block 915 may be performed by an interference component 1035 as described with reference to FIG. 10.

In some implementations, in block 920, the wireless AP or the wireless STA may process the data packet based on the interference metric. The operations of block 920 may be performed in accordance with examples as disclosed herein. In some implementations, aspects of the operations of block 920 may be performed by a data packet component 1040 as described with reference to FIG. 10.

Figure 10:
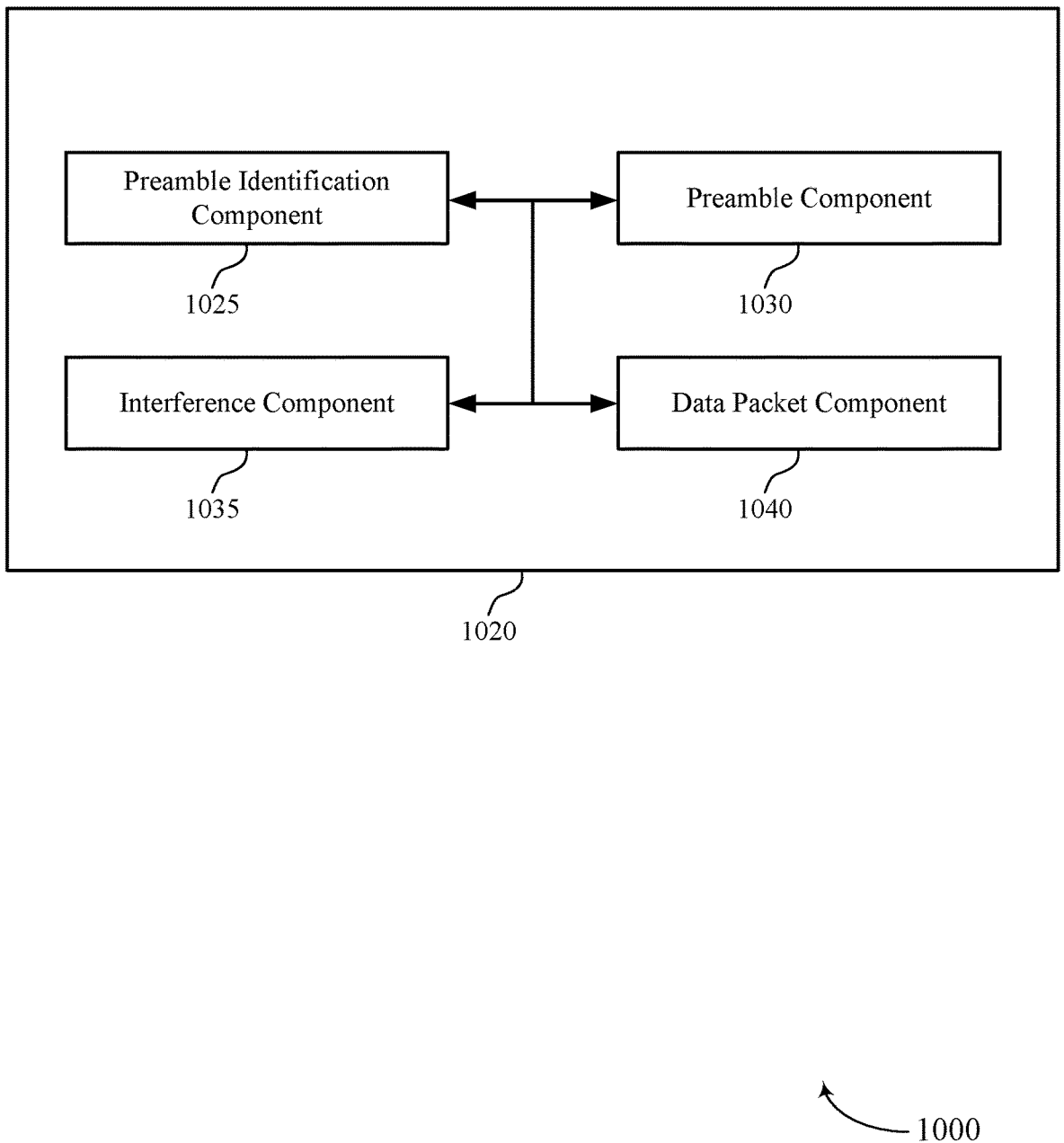
FIG. 10 shows a block diagram of an example wireless communication device that supports techniques for ACI mitigation for UWB systems according to some aspects of the present disclosure.

FIG. 10 shows a block diagram of an example wireless communication device 1000 that supports ACI mitigation for UWB systems. In various examples, the wireless communication device 1000 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively "at least one processor"); one or more radios (collectively "at least one radio"); and one or more memories or memory blocks (collectively "at least one memory"). In some implementations, the at least one processor may include multiple processors, and the at least one memory may include multiple memories. One or more of the multiple processors may be coupled with one or more of the multiple memories which may, individually or collectively, be configured to perform various functions described herein (as part of a processing system).

In some implementations, the wireless communication device 1000 can be a device for use in an AP or STA, such as AP 102 or STA 104 described with reference to FIG. 1. In some other examples, the wireless communication device 1000 can be an AP or STA that includes such a chip, SoC, chipset, package or device as well as multiple antennas. The wireless communication device 1000 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 1000 also includes or can be coupled with at least one application processor which may be further coupled with at least one memory. In some implementations, the wireless communication device 1000 further includes at least one external network interface that enables communication with a core network or backhaul network to gain access to external networks including the Internet.

The wireless communication device 1000 includes a preamble identification component 1025, a preamble component 1030, an interference component 1035, and a data packet component 1040. Portions of one or more of the preamble identification component 1025, the preamble component 1030, the interference component 1035, and the data packet component 1040 may be implemented at least in part in hardware or firmware. For example, one or more of the preamble identification component 1025, the preamble component 1030, the interference component 1035, and the data packet component 1040 may be implemented at least in part by at least one modem. In some implementations, at least some of the preamble identification component 1025, the preamble component 1030, the interference component 1035, and the data packet component 1040 are implemented at least in part by at least one processor and as software stored in at least one memory. For example, portions of one or more of the preamble identification component 1025, the preamble component 1030, the interference component 1035, and the data packet component 1040 can be implemented as non-transitory instructions (or "code") executable by the at least one processor to perform the functions or operations of the respective module.

In some implementations, the at least one processor may be a component of a processing system. A processing system may generally refer to a system or series of machines or components that receives inputs and processes the inputs to produce a set of outputs (which may be passed to other systems or components of, for example, the wireless communication device 1000). For example, a processing system of the wireless communication device 1000 may refer to a system including the various other components or subcomponents of the wireless communication device 1000, such as the at least one processor, or at least one transceiver, or at least one communications manager, or other components or combinations of components of the wireless communication device 1000. The processing system of the wireless communication device 1000 may interface with other components of the wireless communication device 1000, and may process information received from other components (such as inputs or signals) or output information to other components. For example, a chip or modem of the wireless communication device 1000 may include a processing system, a first interface to output information and a second interface to obtain information. In some implementations, the first interface may refer to an interface between the processing system of the chip or modem and a transmitter, such that the wireless communication device 1000 may transmit information output from the chip or modem. In some implementations, the second interface may refer to an interface between the processing system of the chip or modem and a receiver, such that the wireless communication device 1000 may obtain information or signal inputs, and the information may be passed to the processing system. A person having ordinary skill in the art will readily recognize that the first interface also may obtain information or signal inputs, and the second interface also may output information or signal outputs.

The AP or STA 1020 may support wireless communication at a wireless communication device in accordance with examples as disclosed herein. The preamble identification component 1025 is capable of, configured to, or operable to support a means for receiving control information that identifies a preamble for communications to the wireless communication device in an UWB system. The preamble component 1030 is capable of, configured to, or operable to support a means for receiving, via a signal in the UWB system, a data packet that includes the preamble. The interference component 1035 is capable of, configured to, or operable to support a means for determining an interference metric that is based on an estimated CIR of the signal. The data packet component 1040 is capable of, configured to, or operable to support a means for processing the data packet based on the interference metric.

In some implementations, to support determining the interference metric, the interference component 1035 is capable of, configured to, or operable to support a means for estimating the CIR of the signal across the preamble of the data packet, where the interference metric is based on the CIR.

In some implementations, the interference component 1035 is capable of, configured to, or operable to support a means for determining an SINR across the preamble of the data packet, where processing the data packet is based on the interference metric and the SINR.

In some implementations, to support processing the data packet, the data packet component 1040 is capable of, configured to, or operable to support a means for demodulating a post-preamble portion of the data packet based on a value of the interference metric not satisfying an interference threshold, a value of the SINR satisfying a SINR threshold, or both.

In some implementations, to support processing the data packet, the data packet component 1040 is capable of, configured to, or operable to support a means for refraining to demodulate a post-preamble portion of the data packet based on a value of the interference metric satisfying an interference threshold, a value of the SINR not satisfying a SINR threshold, or both.

In some implementations, the preamble component 1030 is capable of, configured to, or operable to support a means for monitoring for one or more additional data packets that include the preamble based on refraining to demodulate the post-preamble portion of the data packet.

In some implementations, the data packet component 1040 is capable of, configured to, or operable to support a means for processing one or more post-preamble portions of the data packet. In some implementations, the interference component 1035 is capable of, configured to, or operable to support a means for outputting an indication of the estimated CIR, or a value of the SINR, or both, for use by an application of the wireless communication device in a determination of whether to drop the data packet. In some implementations, the preamble of the data packet includes one or more symbols of a SYNC field.

In some implementations, the interference component 1035 is capable of, configured to, or operable to support a means for determining that a value of the interference metric satisfies an interference threshold. In some implementations, the interference component 1035 is capable of, configured to, or operable to support a means for determining a first value of an SINR across a portion of the preamble of the data packet based on the value of the interference metric satisfying the interference threshold, where processing the data packet is based on the first value of the SINR.

In some implementations, the interference component 1035 is capable of, configured to, or operable to support a means for determining that the first value of the SINR fails to satisfy an SINR threshold. In some implementations, the data packet component 1040 is capable of, configured to, or operable to support a means for refraining to demodulate a post-preamble portion of the data packet based on the first value of the SINR not satisfying the SINR threshold.

In some implementations, the interference component 1035 is capable of, configured to, or operable to support a means for determining that the first value of the SINR satisfies an SINR threshold. In some implementations, the interference component 1035 is capable of, configured to, or operable to support a means for initiating a timer in response to the value of the interference metric satisfying the interference threshold. In some implementations, the data packet component 1040 is capable of, configured to, or operable to support a means for refraining to demodulate a post-preamble portion of the data packet based on the first value of the SINR satisfying the SINR threshold and a duration of the timer satisfying a time threshold. In some implementations, the portion of the preamble of the data packet includes one or more symbols of the preamble.

In some implementations, to support determining the interference metric, the interference component 1035 is capable of, configured to, or operable to support a means for sampling the estimated CR to obtain a set of multiple taps, where each tap of the set of multiple taps corresponds to a magnitude of the estimated CIR at a respective time instance. In some implementations, to support determining the interference metric, the interference component 1035 is capable of, configured to, or operable to support a means for selecting a first tap from the set of multiple taps, where a value of the first tap is greater than a respective value of each remaining taps of the set of multiple taps. In some implementations, to support determining the interference metric, the interference component 1035 is capable of, configured to, or operable to support a means for selecting a second tap from among the second tap and a third tap of the set of multiple taps, where the second tap and the third tap are adjacent to the first tap in time, and where a value of the second tap is greater than a value of the third tap. In some implementations, to support determining the interference metric, the interference component 1035 is capable of, configured to, or operable to support a means for determining the interference metric based on the first tap and the second tap.

In some implementations, the interference metric is based on a phase difference between the first tap and the second tap. In some implementations, a duration between the first tap and the second tap includes half of a chip duration.

In some implementations, to support determining the interference metric, the interference component 1035 is capable of, configured to, or operable to support a means for determining a combined interference metric that is based on a set of multiple estimated CIRs of the signal across the set of multiple antennas, each estimated CIR corresponds to a respective antenna of the set of multiple antennas.

Implementation examples are described in the following numbered clauses:

Aspect 1: A method for wireless communication at a wireless communication device, comprising: receiving control information that identifies a preamble for communications to the wireless communication device in an UWB system; receiving, via a signal in the UWB system, a data packet that includes the preamble; determining an interference metric that is based at least in part on an estimated CR of the signal; and processing the data packet based at least in part on the interference metric.

Aspect 2: The method of aspect 1, wherein determining the interference metric comprises: estimating the CR of the signal across the preamble of the data packet, wherein the interference metric is based at least in part on the CIR.

Aspect 3: The method of aspect 2, further comprising: determining a SINR across the preamble of the data packet, wherein processing the data packet is based at least in part on the interference metric and the SINR.

Aspect 4: The method of aspect 3, wherein processing the data packet comprises: demodulating a post-preamble portion of the data packet based at least in part on a value of the interference metric not satisfying an interference threshold, a value of the SINR satisfying a SINR threshold, or both.

Aspect 5: The method of aspect 3, wherein processing the data packet comprises: refraining to demodulate a post-preamble portion of the data packet based at least in part on a value of the interference metric satisfying an interference threshold, a value of the SINR not satisfying a SINR threshold, or both.

Aspect 6: The method of aspect 5, further comprising: monitoring for one or more additional data packets that include the preamble based at least in part on refraining to demodulate the post-preamble portion of the data packet.

Aspect 7: The method of aspect 3, further comprising: processing one or more post-preamble portions of the data packet; and outputting an indication of the estimated CIR, or a value of the SINR, or both, for use by an application of the wireless communication device in a determination of whether to drop the data packet.

Aspect 8: The method of any of aspects 2 through 7, wherein the preamble of the data packet comprises one or more symbols of a synchronization field.

Aspect 9: The method of any of aspects 2 through 8, further comprising: determining that a value of the interference metric satisfies an interference threshold; and determining a first value of a SINR across a portion of the preamble of the data packet based at least in part on the value of the interference metric satisfying the interference threshold, wherein processing the data packet is based at least in part on the first value of the SINR.

Aspect 10: The method of aspect 9, further comprising: determining that the first value of the SINR fails to satisfy a SINR threshold; and refraining to demodulate a post-preamble portion of the data packet based at least in part on the first value of the SINR not satisfying the SINR threshold.

Aspect 11: The method of aspect 9, further comprising: determining that the first value of the SINR satisfies a SINR threshold; initiating a timer in response to the value of the interference metric satisfying the interference threshold; and refraining to demodulate a post-preamble portion of the data packet based at least in part on the first value of the SINR satisfying the SINR threshold and a duration of the timer satisfying a time threshold.

Aspect 12: The method of any of aspects 9 through 11, wherein the portion of the preamble of the data packet comprises one or more symbols of the preamble.

Aspect 13: The method of any of aspects 1 through 12, wherein determining the interference metric comprises: sampling the estimated CIR to obtain a plurality of taps, wherein each tap of the plurality of taps corresponds to a magnitude of the estimated CIR at a respective time instance; selecting a first tap from the plurality of taps, wherein a value of the first tap is greater than a respective value of each remaining taps of the plurality of taps; selecting a second tap from among the second tap and a third tap of the plurality of taps, wherein the second tap and the third tap are adjacent to the first tap in time, and wherein a value of the second tap is greater than a value of the third tap; and determining the interference metric based at least in part on the first tap and the second tap.

Aspect 14: The method of aspect 13, wherein the interference metric is based at least in part on a phase difference between the first tap and the second tap.

Aspect 15: The method of any of aspects 13 through 14, wherein a duration between the first tap and the second tap comprises half of a chip duration.

Aspect 16: The method of any of aspects 1 through 15, wherein the wireless communication device comprises a plurality of antennas, and wherein determining the interference metric comprises: determining a combined interference metric that is based at least in part on a plurality of estimated CIRs of the signal across the plurality of antennas, each estimated CIR corresponds to a respective antenna of the plurality of antennas.

Aspect 17: An apparatus for wireless communication at a wireless communication device, comprising at least one processor; at least one memory coupled with the at least one processor; and instructions stored in the at least one memory and executable by the at least one processor to cause the apparatus to perform a method of any of aspects 1 through 16.

Aspect 18: An apparatus for wireless communication at a wireless communication device, comprising at least one means for performing a method of any of aspects 1 through 16.

Aspect 19: A non-transitory computer-readable medium storing code for wireless communication at a wireless communication device, the code comprising instructions executable by a processor to perform a method of any of aspects 1 through 16.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication at a wireless communication device, comprising:
    at least one processor;
    at least one memory coupled with the at least one processor; and
    instructions stored in the at least one memory and executable by the at least one processor to cause the apparatus to:
        receive control information that identifies a preamble for communications to the wireless communication device in an ultra-wideband system;
        receive, via a signal in the ultra-wideband system, a data packet that includes the preamble;
        determine an interference metric that is based at least in part on an estimated channel impulse response of the signal; and
        process the data packet based at least in part on the interference metric.

2. The apparatus of claim 1, wherein the instructions to determine the interference metric are executable by the at least one processor to cause the apparatus to:
    estimate the channel impulse response of the signal across the preamble of the data packet, wherein the interference metric is based at least in part on the channel impulse response.

3. The apparatus of claim 2, wherein the instructions are further executable by the at least one processor to cause the apparatus to:
    determine a signal to interference plus noise ratio across the preamble of the data packet, wherein processing the data packet is based at least in part on the interference metric and the signal to interference plus noise ratio.

4. The apparatus of claim 3, wherein the instructions to process the data packet are executable by the at least one processor to cause the apparatus to:
    demodulate a post-preamble portion of the data packet based at least in part on a value of the interference metric not satisfying an interference threshold, a value of the signal to interference plus noise ratio satisfying a signal to interference plus noise ratio threshold, or both.

5. The apparatus of claim 3, wherein the instructions to process the data packet are executable by the at least one processor to cause the apparatus to:
refrain to demodulate a post-preamble portion of the data packet based at least in part on a value of the interference metric satisfying an interference threshold, a value of the signal to interference plus noise ratio not satisfying a signal to interference plus noise ratio threshold, or both.

6. The apparatus of claim 5, wherein the instructions are further executable by the at least one processor to cause the apparatus to:
monitor for one or more additional data packets that include the preamble based at least in part on refraining to demodulate the post-preamble portion of the data packet.

7. The apparatus of claim 3, wherein the instructions are further executable by the at least one processor to cause the apparatus to:
process one or more post-preamble portions of the data packet; and
output an indication of the estimated channel impulse response, or a value of the signal to interference plus noise ratio, or both, for use by an application of the wireless communication device in a determination of whether to drop the data packet.

8. The apparatus of claim 2, wherein the preamble of the data packet comprises one or more symbols of a synchronization field.

9. The apparatus of claim 2, wherein the instructions are further executable by the at least one processor to cause the apparatus to:
determine that a value of the interference metric satisfies an interference threshold; and
determine a first value of a signal to interference plus noise ratio across a portion of the preamble of the data packet based at least in part on the value of the interference metric satisfying the interference threshold, wherein processing the data packet is based at least in part on the first value of the signal to interference plus noise ratio.

10. The apparatus of claim 9, wherein the instructions are further executable by the at least one processor to cause the apparatus to:
determine that the first value of the signal to interference plus noise ratio fails to satisfy a signal to interference plus noise ratio threshold; and
refrain to demodulate a post-preamble portion of the data packet based at least in part on the first value of the signal to interference plus noise ratio not satisfying the signal to interference plus noise ratio threshold.

11. The apparatus of claim 9, wherein the instructions are further executable by the at least one processor to cause the apparatus to:
determine that the first value of the signal to interference plus noise ratio satisfies a signal to interference plus noise ratio threshold;
initiate a timer in response to the value of the interference metric satisfying the interference threshold; and
refrain to demodulate a post-preamble portion of the data packet based at least in part on the first value of the signal to interference plus noise ratio satisfying the signal to interference plus noise ratio threshold and a duration of the timer satisfying a time threshold.

12. The apparatus of claim 9, wherein the portion of the preamble of the data packet comprises one or more symbols of the preamble.

13. The apparatus of claim 1, wherein the instructions to determine the interference metric are executable by the at least one processor to cause the apparatus to:
sample the estimated channel impulse response to obtain a plurality of taps, wherein each tap of the plurality of taps corresponds to a magnitude of the estimated channel impulse response at a respective time instance;
select a first tap from the plurality of taps, wherein a value of the first tap is greater than a respective value of each remaining taps of the plurality of taps;
select a second tap from among the second tap and a third tap of the plurality of taps, wherein the second tap and the third tap are adjacent to the first tap in time, and wherein a value of the second tap is greater than a value of the third tap; and
determine the interference metric based at least in part on the first tap and the second tap.

14. The apparatus of claim 13, wherein the interference metric is based at least in part on a phase difference between the first tap and the second tap.

15. The apparatus of claim 13, wherein a duration between the first tap and the second tap comprises half of a chip duration.

16. The apparatus of claim 1, wherein the apparatus comprises a plurality of antennas, and wherein the instructions to determine the interference metric are executable by the at least one processor to cause the apparatus to:
determine a combined interference metric that is based at least in part on a plurality of estimated channel impulse responses of the signal across the plurality of antennas, each estimated channel impulse response corresponds to a respective antenna of the plurality of antennas.

17. A method for wireless communication at a wireless communication device, comprising:
receiving control information that identifies a preamble for communications to the wireless communication device in an ultra-wideband system;
receiving, via a signal in the ultra-wideband system, a data packet that includes the preamble;
determining an interference metric that is based at least in part on an estimated channel impulse response of the signal; and
processing the data packet based at least in part on the interference metric.

18. The method of claim 17, wherein determining the interference metric comprises:
estimating the channel impulse response of the signal across the preamble of the data packet, wherein the interference metric is based at least in part on the channel impulse response.

19. The method of claim 18, further comprising:
determining a signal to interference plus noise ratio across the preamble of the data packet, wherein processing the data packet is based at least in part on the interference metric and the signal to interference plus noise ratio.

20. The method of claim 19, wherein processing the data packet comprises:
demodulating a post-preamble portion of the data packet based at least in part on a value of the interference metric not satisfying an interference threshold, a value of the signal to interference plus noise ratio satisfying a signal to interference plus noise ratio threshold, or both.

21. The method of claim 19, wherein processing the data packet comprises:
refraining to demodulate a post-preamble portion of the data packet based at least in part on a value of the interference metric satisfying an interference threshold, a value of the signal to interference plus noise ratio not satisfying a signal to interference plus noise ratio threshold, or both.

22. The method of claim 21, further comprising:
monitoring for one or more additional data packets that include the preamble based at least in part on refraining to demodulate the post-preamble portion of the data packet.

23. The method of claim 19, further comprising:
processing one or more post-preamble portions of the data packet; and
outputting an indication of the estimated channel impulse response, or a value of the signal to interference plus noise ratio, or both, for use by an application of the wireless communication device in a determination of whether to drop the data packet.

24. The method of claim 18, further comprising:
determining that a value of the interference metric satisfies an interference threshold; and
determining a first value of a signal to interference plus noise ratio across a portion of the preamble of the data packet based at least in part on the value of the interference metric satisfying the interference threshold, wherein processing the data packet is based at least in part on the first value of the signal to interference plus noise ratio.

25. An apparatus for wireless communication at a wireless communication device, comprising:
means for receiving control information that identifies a preamble for communications to the wireless communication device in an ultra-wideband system;
means for receiving, via a signal in the ultra-wideband system, a data packet that includes the preamble;
means for determining an interference metric that is based at least in part on an estimated channel impulse response of the signal; and
means for processing the data packet based at least in part on the interference metric.

26. The apparatus of claim 25, wherein the means for determining the interference metric comprise:
means for estimating the channel impulse response of the signal across the preamble of the data packet, wherein the interference metric is based at least in part on the channel impulse response.

27. The apparatus of claim 26, further comprising:
means for determining a signal to interference plus noise ratio across the preamble of the data packet, wherein processing the data packet is based at least in part on the interference metric and the signal to interference plus noise ratio.

28. A non-transitory computer-readable medium storing code for wireless communication at a wireless communication device, the code comprising instructions executable by a processor to:
receive control information that identifies a preamble for communications to the wireless communication device in an ultra-wideband system;
receive, via a signal in the ultra-wideband system, a data packet that includes the preamble;
determine an interference metric that is based at least in part on an estimated channel impulse response of the signal; and
process the data packet based at least in part on the interference metric.

29. The non-transitory computer-readable medium of claim 28, wherein the instructions to determine the interference metric are executable by the processor to:
sample the estimated channel impulse response to obtain a plurality of taps, wherein each tap of the plurality of taps corresponds to a magnitude of the estimated channel impulse response at a respective time instance;
select a first tap from the plurality of taps, wherein a value of the first tap is greater than a respective value of each remaining taps of the plurality of taps;
select a second tap from among the second tap and a third tap of the plurality of taps, wherein the second tap and the third tap are adjacent to the first tap in time, and wherein a value of the second tap is greater than a value of the third tap; and
determine the interference metric based at least in part on the first tap and the second tap.

30. The non-transitory computer-readable medium of claim 29, wherein the interference metric is based at least in part on a phase difference between the first tap and the second tap.

* * * * *